US010160595B1

(12) United States Patent
Ziegs

(10) Patent No.: US 10,160,595 B1
(45) Date of Patent: Dec. 25, 2018

(54) MODULAR FLUID STORAGE TANK

(71) Applicant: Dustin Ziegs, Grand Junction, CO (US)

(72) Inventor: Dustin Ziegs, Grand Junction, CO (US)

( * ) Notice: Subject to any disclaimer, the term of this patent is extended or adjusted under 35 U.S.C. 154(b) by 0 days.

(21) Appl. No.: 15/419,326

(22) Filed: Jan. 30, 2017

Related U.S. Application Data

(63) Continuation-in-part of application No. 14/827,442, filed on Aug. 17, 2015, now Pat. No. 9,555,959.

(51) Int. Cl.

| | |
|---|---|
| ***B65D 90/02*** | (2006.01) |
| ***B23P 19/04*** | (2006.01) |
| ***B65D 88/02*** | (2006.01) |
| ***B65D 90/10*** | (2006.01) |
| ***B65D 90/08*** | (2006.01) |
| ***B65D 88/54*** | (2006.01) |

(52) U.S. Cl.
CPC ............ *B65D 90/023* (2013.01); *B23P 19/04* (2013.01); *B65D 88/02* (2013.01); *B65D 88/54* (2013.01); *B65D 90/08* (2013.01); *B65D 90/10* (2013.01)

(58) Field of Classification Search
CPC ...... B65D 90/023; B65D 88/02; B65D 88/54; B65D 90/10; B65D 90/08; B23P 19/04
USPC ...... 220/565, 567, 567.1, 567.2, 567.3, 666, 220/4.16, 4.28, 4.08
See application file for complete search history.

(56) References Cited

U.S. PATENT DOCUMENTS

| | | | | |
|---|---|---|---|---|
| 4,819,820 A * | 4/1989 | Weiner | B65D 88/022 220/1.5 |
| 5,193,714 A | 3/1993 | Carey | |
| 5,820,718 A | 10/1998 | Dean | |
| 5,979,686 A | 11/1999 | Dean | |
| 6,065,625 A | 5/2000 | Bonerb et al. | |
| 6,161,272 A | 12/2000 | Madison | |
| 6,161,719 A | 12/2000 | Madison | |
| 6,216,900 B1 | 4/2001 | Bonerb et al. | |
| 6,299,437 B1 | 10/2001 | Bonerb et al. | |
| 6,533,122 B1 * | 3/2003 | Plunkett | B65D 19/12 206/600 |
| 6,732,881 B1 | 5/2004 | Gulati | |
| 6,739,469 B1 * | 5/2004 | Kim | B65D 88/08 220/4.12 |
| 7,100,261 B2 | 9/2006 | Gulati | |
| 7,111,750 B2 | 9/2006 | Gulati et al. | |
| 7,171,787 B2 | 2/2007 | Thomason et al. | |
| 8,943,841 B2 | 2/2015 | Lee et al. | |
| 9,120,611 B2 | 9/2015 | Ziegs | |
| 2010/0045017 A1 | 2/2010 | Rea | |
| 2010/0320201 A1 | 12/2010 | Dagesse | |
| 2011/0017731 A1 * | 1/2011 | Taravella | B65D 5/029 220/4.28 |

* cited by examiner

*Primary Examiner* — Kareen Thomas
(74) *Attorney, Agent, or Firm* — Luis Figarella

(57) ABSTRACT

A flexible fluid storage tank and method for assembling said tank, with specific emphasis on a system that may be easily road transported and field assembled with little or no tools, while preserving the flexibility of being tailored in size, shape and configuration to the user's needs with minimal customization and disassembly capabilities.

8 Claims, 39 Drawing Sheets

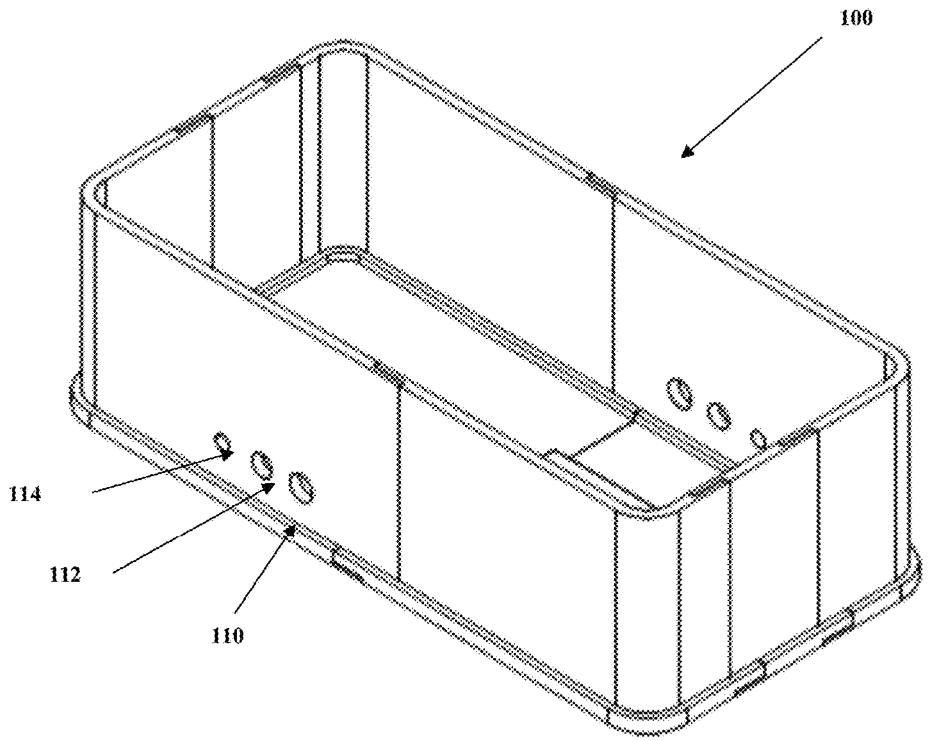
Fig. 1A
Fig. 1B
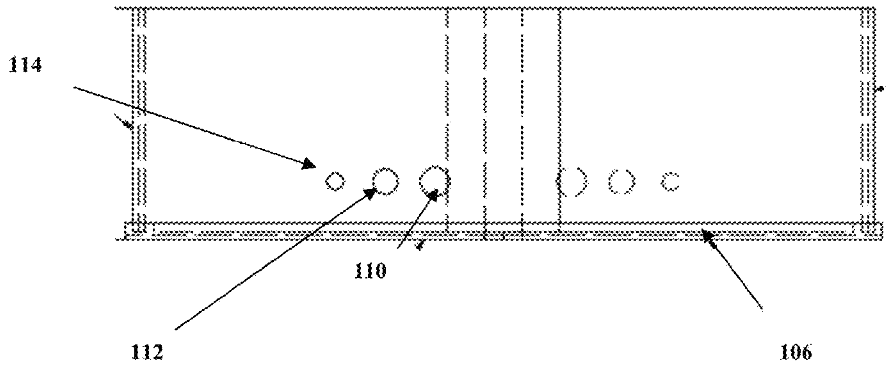

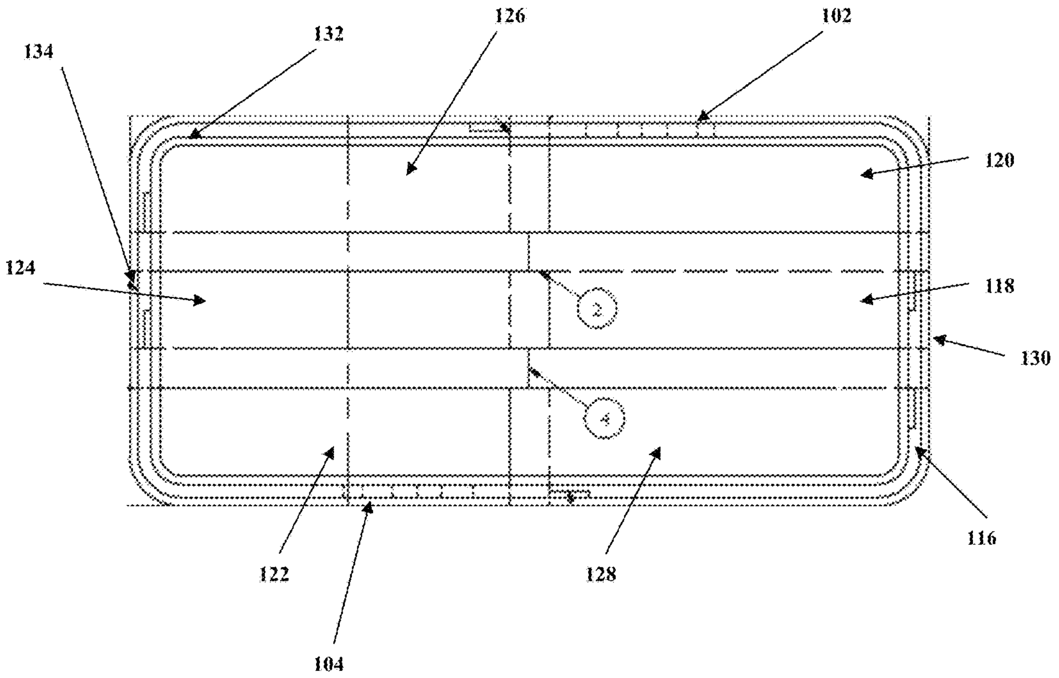
Fig. 1C
Fig. 1D
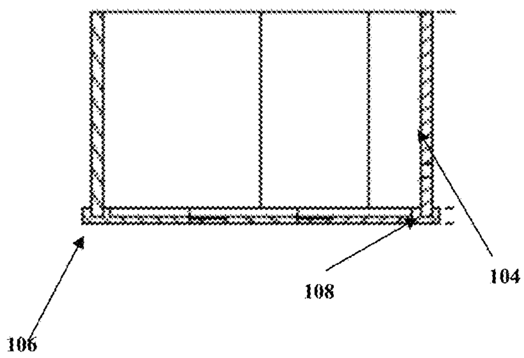
Fig. 1E
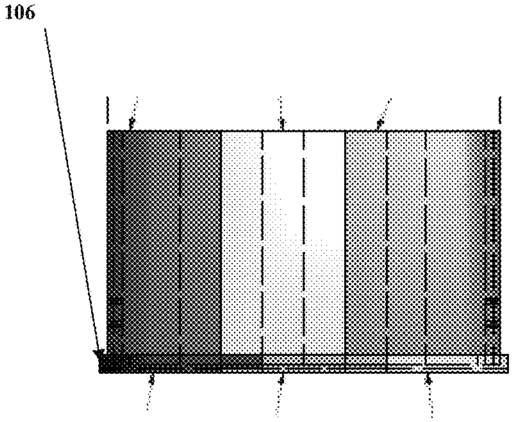

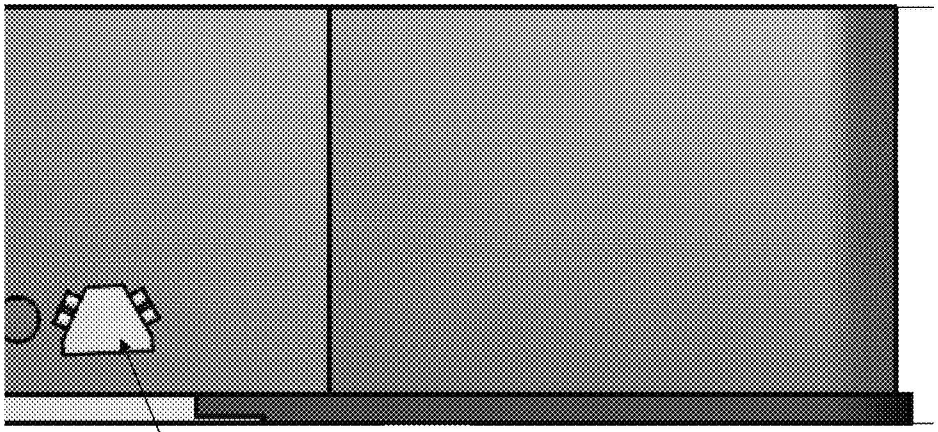
Fig. 11
Fig. 12
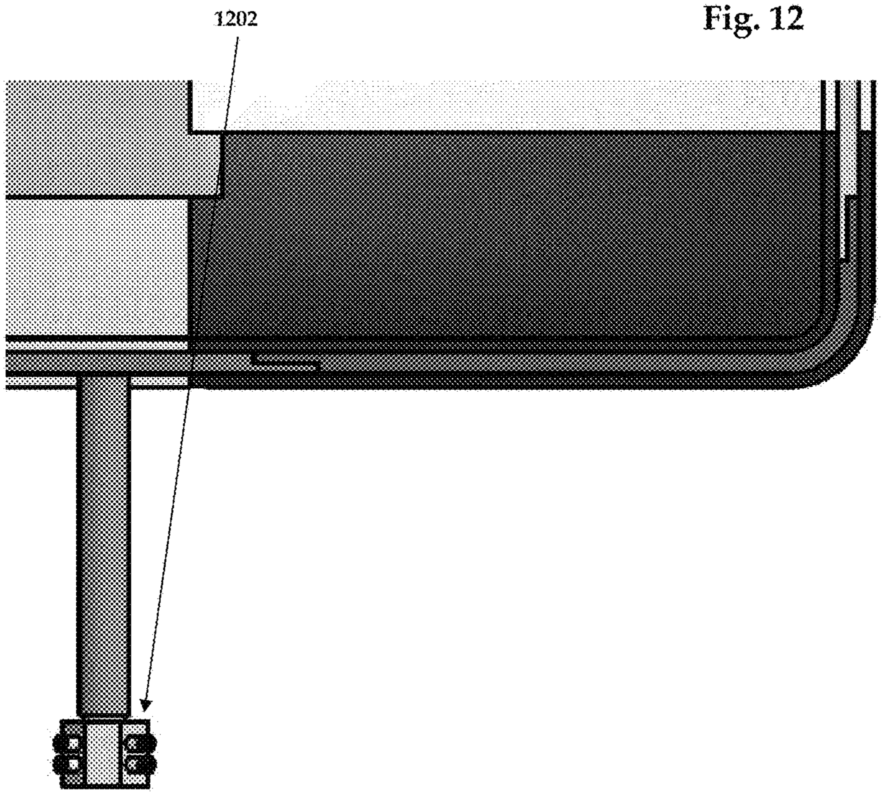

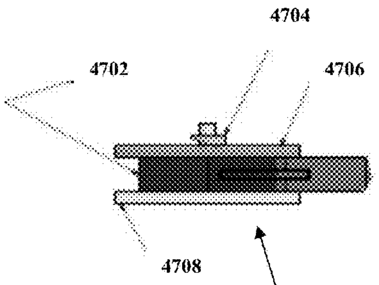
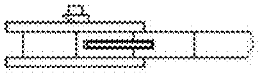
Figure 47
Figure 48
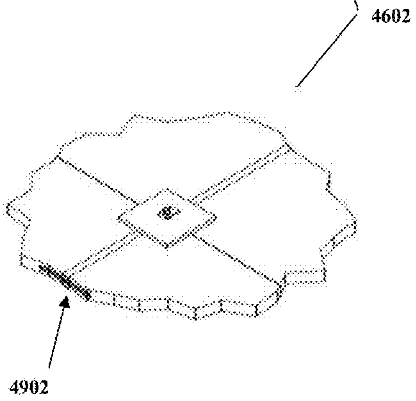
Figure 49
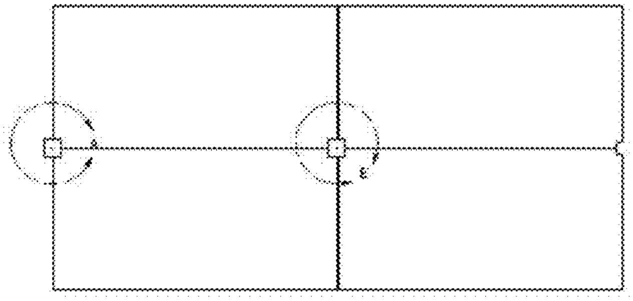
Figure 50
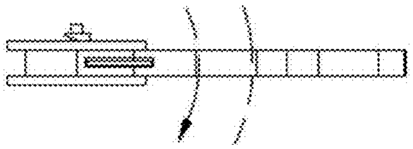
Figure 51

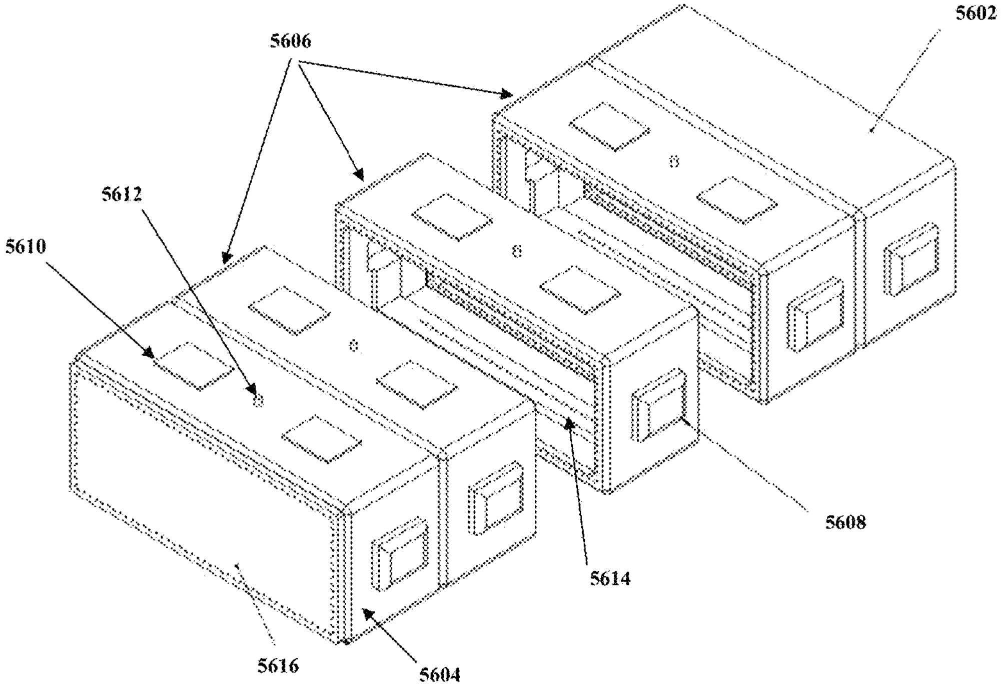
Figure 56
Figure 57
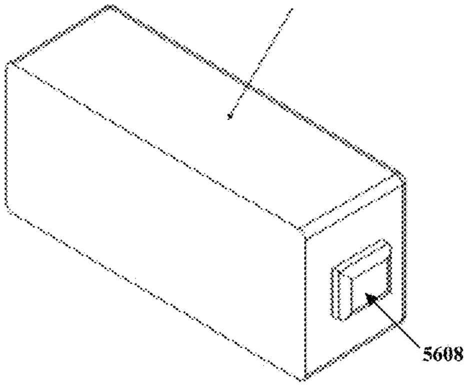
Figure 58
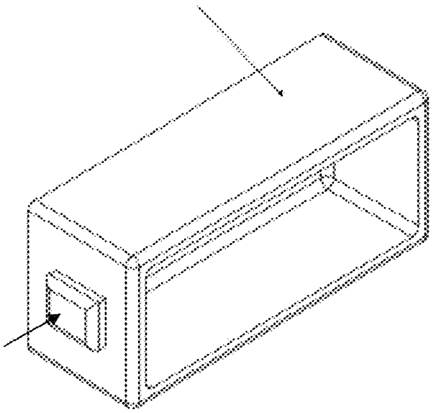

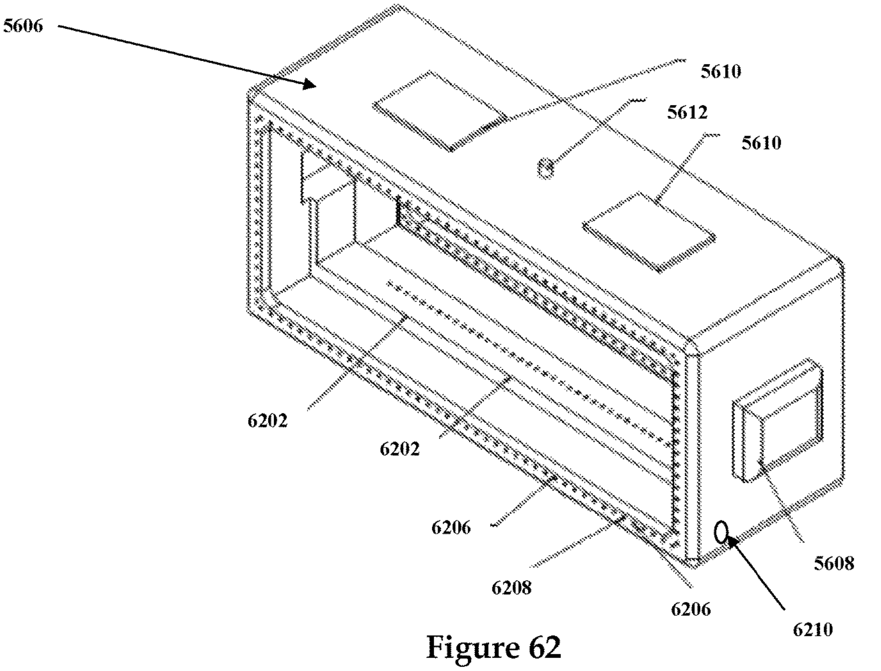
Figure 62
Figure 63
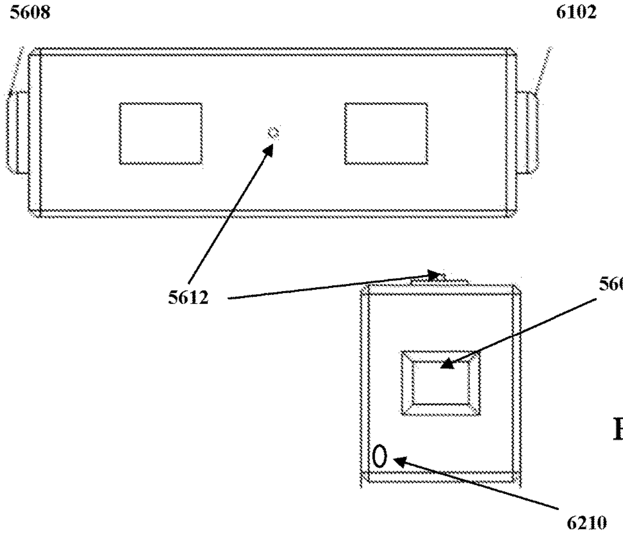
Figure 64
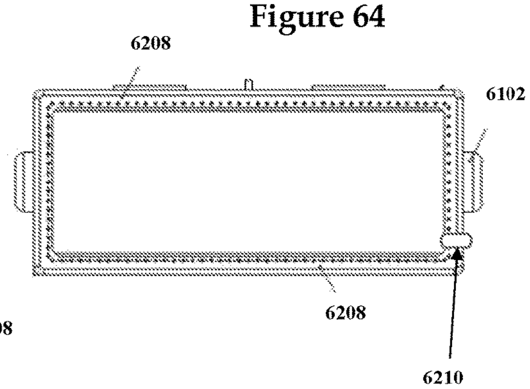
Figure 65

Figure 75
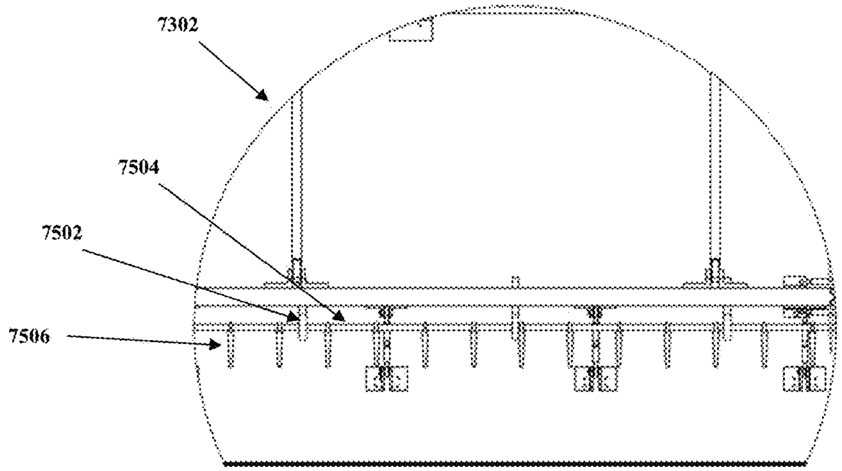
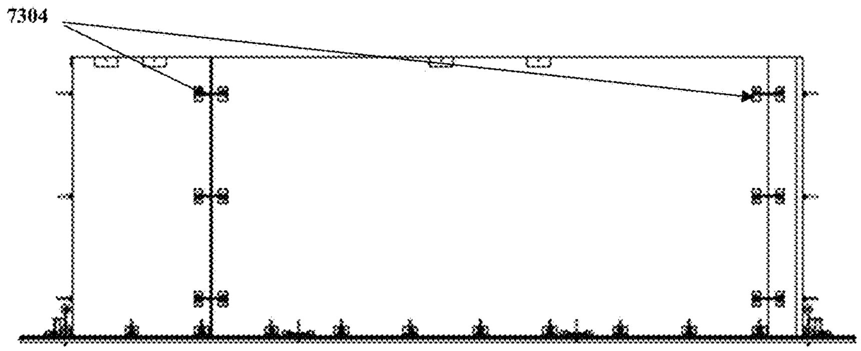
Figure 76

MODULAR FLUID STORAGE TANK

CROSS-REFERENCE TO RELATED APPLICATIONS

This application claims priority to pending U.S. patent application Ser. No. 14/827,442 "Modular Fluid Storage Tank", filed on Aug. 17, 2015 the disclosure of which is herein incorporated by reference in its entirety.

PATENTS CITED

The following documents and references are incorporated by reference in their entirety, Dean (U.S. Pat. Nos. 5,820,718 and 5,979,686), Madison (U.S. Pat. Nos. 6,161,272 and 6,161,719), Bonerb et al (U.S. Pat. Nos. 6,065,625, 6,216,900 and 6,299,347), Rea (U.S. Pat. Pub. No. 2010/0045017), Dagesse (U.S. Pat. Pub. No. 2010/0320201), Gulati (U.S. Pat. No. 7,100,261) and Ziegs (U.S. Pat. No. 9,120,611).

FIELD OF THE INVENTION

The present invention relates to fluid storage tanks. More particularly, the present invention relates to an apparatus, system and method for assembling and using a modular fluid storage tank. Additionally, the present invention relates to system, methods and apparatus for deploying tanks that are expandable in the field.

DESCRIPTION OF THE RELATED ART

Fluid storage tanks, particularly those targeting the storage of liquids, gases and their mix, particularly when storing low temperature liquids such as Liquefied Natural Gas (LNG) are very useful for such applications such as drilling, agriculture and other such applications must have high strength requirements, mainly due to the weight of the fluid stored in the tanks, but also because of the ground they are usually placed on. This dictates that in many cases, these tanks be built of monolithic assemblies that are either welded, screwed or use fixed dimensions liners.

Many fluid storage tanks have been developed with side, bottom and top pieces welded together to form the tank. Others have bolted members. Others have a liner placed inside, avoiding the need for precise joining of the welds. A traditional technique for forming such liquid storage tanks is shown in T. S. Dean (U.S. Pat. No. 5,820,718). As shown in that patent, the floor of the tank is placed on a support surface and the sides and ends are welded internally to the floor.

A lid is then placed onto the opposite ends of the sides and ends and is welded to the sides and the ends by placing the lid a small distance below an upper edge of the sides and ends. In this manner, a single external weld is applied between the lid and the sides and ends. In this traditional technique of forming liquid storage tanks, it is only possible to apply a single external weld between the lid and the sides and the ends.

In contrast, there is a need within certain industries (e.g. gas and oil drilling, particularly for fracking) for a flexible fluid tank that may be easily transported along roads and highways, then quickly assembled in situ with light or no tools.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a modular fluid storage system comprising one or more modules defining all or part of a sealed enclosed volume, each said module having one or more open sides, each said module open side having one or more module interlocking means and impermeable sealing means to allow said module to be securely attached to another said module and/or an end cap, one or more module or end cap wall openings; and one or more access panel hatch installed in at least one module or end cap, said hatch allowing access to the interior of said sealed enclosed volume. In another aspect, one or more of said modules are equipped with cooling, heating, pressure relief valves, vacuum relief valves and/or filters and/or other inner volume environmental control devices. In yet another aspect one or more of said modules are made with one or more high R-value materials in a composite combination. In another aspect said module interlocking means are comprised of one or more bolts and said module impermeable sealing means are comprised of one or more impermeable seal interface mechanical pressure fittings located along said module's opening edge. In yet another aspect, one or more said impermeable sealing interface mechanical pressure fittings include at least one element selected from the group comprised by a gasket, O-ring, silicon weld, rhino-liner or other suitable seal.

In one aspect, the invention is about a method of making a liquid storage tank apparatus comprising providing one or more modules defining all or part of a sealed enclosed volume, each said module having one or more open sides, each said module open side having one or more module interlocking means and impermeable sealing means to allow said module to be securely attached to another said module and/or an end cap, providing one or more module or end cap wall openings; and providing one or more access panel hatch installed in at least one module or end cap, said hatch allowing access to the interior of said sealed enclosed volume. In another aspect one or more of said modules are equipped with cooling, heating, filters and/or other inner volume environmental control devices. In yet another aspect, one or more of said modules are made with one or more high R-value materials in a composite combination. In another aspect said module interlocking means are comprised of one or more bolts and said module impermeable sealing means are comprised of one or more impermeable seal interface mechanical pressure fittings located along said module's opening edge. In yet another aspect one or more said impermeable sealing interface mechanical pressure fittings include at least one element selected from the group comprised by a gasket, O-ring, silicon weld, rhino-liner or other suitable seal.

In one aspect the invention is about a liquid storage tank apparatus comprising a tank base comprised of two or more floor panels, each said panel having one or more floor panel interlocking and waterproof sealing means, and a rim protruding upwards along the portions of said floor panels forming the external perimeter of said liquid storage tank, tank walls comprised of two or more tank wall panels, each said tank wall panel having one or more matching sets of wall interlocking and waterproof sealing means along the wall panel side and bottom joints, wherein at least one said wall panel has one or more wall openings; and base-wall interface waterproof sealing means at or near the periphery of said tank base. In another aspect, said floor or wall interlocking and waterproof sealing means are comprised of one or more waterproof seal interface mechanical pressure fittings located along said floor panels or said tank wall panels joints. In yet another aspect, one or more of said floor panel or wall panel interlocking means are comprised of one or more binders and binder attachment points arrangements. In another aspect one or more said floor or wall waterproof seal interface mechanical pressure fittings include at least one element selected from the group comprised by a gasket, O-ring, silicon weld, rhino-liner or other suitable seal and said base-wall interface waterproof seal interface mechanical pressure fittings include at least one element selected from the group comprised of a continuous base channel or one or more gaskets around its inner perimeter where said base interfaces with said wall's base. In yet another aspect, one or more of said floor panel to wall panel interlocking means are comprised of one or more eyeholes connected by rods and secured to each other by binders.

Other features and advantages of the present invention will become apparent upon examining the following detailed description of an embodiment thereof, taken in conjunction with the attached drawings.

BRIEF DESCRIPTION OF THE DRAWINGS

FIG. 1A shows an isometric view of a proposed flexible fluid tank, according to an exemplary embodiment of the invention.

FIG. 1B shows a side view of a proposed flexible fluid tank, according to an exemplary embodiment of the invention.

FIG. 1C shows a top view of a proposed flexible fluid tank, according to an exemplary embodiment of the invention.

FIG. 1D shows a front view of a proposed flexible fluid tank, according to an exemplary embodiment of the invention.

FIG. 1E shows a front view of a proposed flexible fluid tank, according to an exemplary embodiment of the invention.

FIG. 11 shows a side view of a proposed flexible fluid tank, according to an exemplary embodiment of the invention.

FIG. 12 shows a top view of a proposed flexible fluid tank, according to an exemplary embodiment of the invention.

FIGS. 45-51 show various views of a rectangular proposed flexible fluid tank, according to various exemplary embodiments.

FIGS. 56-72 show various views of a proposed modular tank system having two or more modules that create a fluid tank (including liquid and gases), according to various exemplary embodiments.

FIGS. 73-79 show various views of a proposed modular tank system having binder attachment system improvements, according to various exemplary embodiments.

Figure 2A:
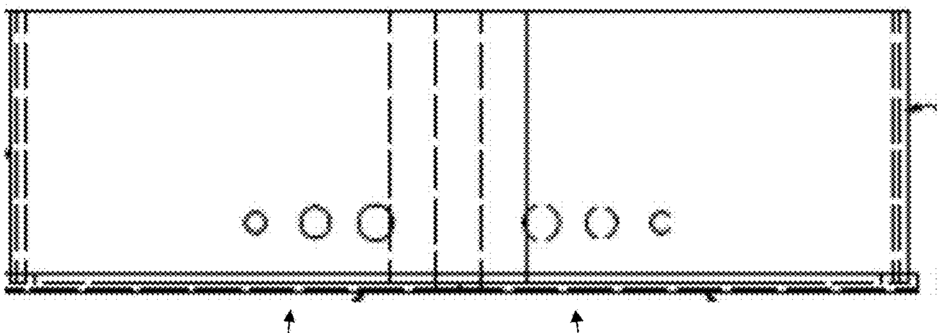
FIG. 2A shows a side view of a proposed flexible fluid tank, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIGS. 1A-1E we see one proposed embodiment of the invention 100. In one embodiment, the flexible fluid tank is formed by a combination of two or more sides or wall panels (102, 104) and a base 106. While a rectangular shaped tank is shown, the tank may be round, elliptical, square or of any other suitable shape. Such a tank has a number of advantages; it is liner-less (although one may be fitted if desired), it is mobile, faster to set up, ports may be fitted in either the sides or the bottom, the actual capacity (as well as size) of the tank may be grown or shrunk via the addition of panels and the tank may have an optional lid.

When referring to fluids, we refer to the group comprised by such liquids as water and others, including their use for FRAC or fracturing drilling water and associated liquids. The terms fluid and liquid may be interchangeably used in this specification. An advantage of having a tank like this be a liner less is that you won't have to pay for a liner every time the tank is set up, or for the disposal of such liner after its (frequent) one time use.

Referring to FIG. 1D, we see how the tank sides or walls (102, 104) bottom's fit into a channel 108 built around the periphery of the tank's base 106. In one embodiment, both the walls and/or the bottoms of the channel 108 have gaskets or other suitable fluid sealing means within them, in order to prevent the fluid from seeping out from the tank inside (or vice versa).

In an alternate embodiment, one or more of the floor or base 106 portions may be equipped with drain openings. Such a liner-less tank allows the hydration units to pull water from the tanks without the use of a candy cane suction line and to use their own pumps instead of a separate tank supply pump. Use of a non-collapsible tank like this also makes it potentially safer and easier to set up and move around.

The base 106 of the tank may be comprised of one or more base or floor panels (116, 118, 120, 122, 124, 126), designed to be shaped in an interlocking form and inter-joined through weight as well as through a tear shaped or otherwise suitable shaped pin 806 that are designed to be inserted into loops, hooks or nubs 310 or other mechanically attached extensions of one panel, so that they are designed to keep the joints under pressure.

In one embodiment, said pressure is generated by the tear shape of portions of the pin 806, so that when the pin 806 is rotated, the pressure on the hook or nub 310 presses both panels together against each other and/or the optional sealing means of a gasket, O-ring, silicone weld, rhino liner or seal 308. In an alternate embodiment, the same may be accomplished using screws and matching nuts, press pliers, etc. In such a way, the tank may be assembled, disassembled, stored, transported and re-used. In such a fashion, the tank becomes both reusable and may be assembled/disassembled as required. The walls may themselves be comprised of two or more portions, wall or side panels (102, 104, 128, 130, 132, 134), also designed to be joined through pin/hooks.

Figure 2B:
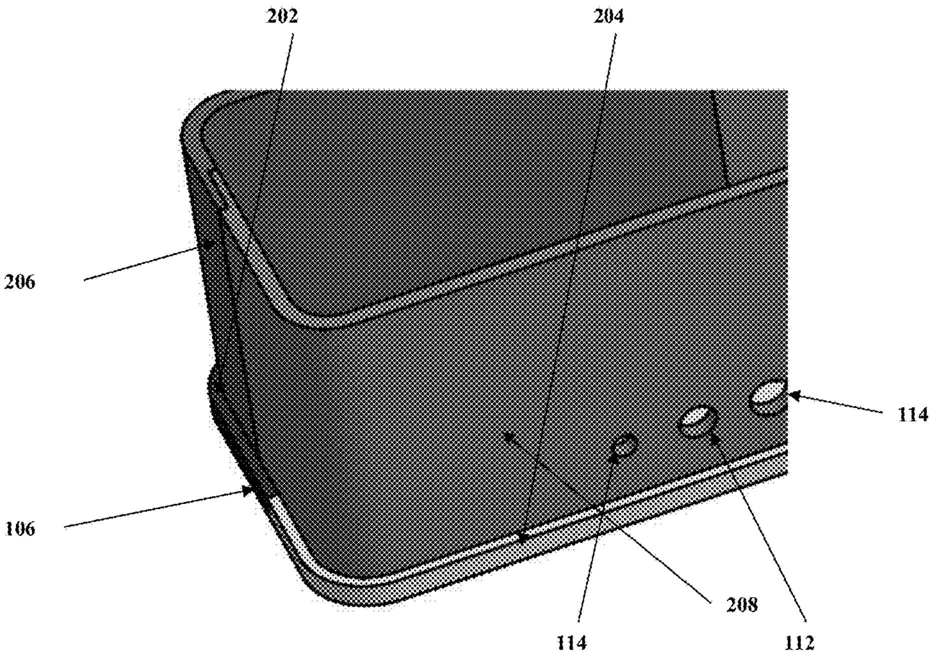
FIG. 2B shows an isometric view of a proposed flexible fluid tank, according to an exemplary embodiment of the invention.
Figure 3:
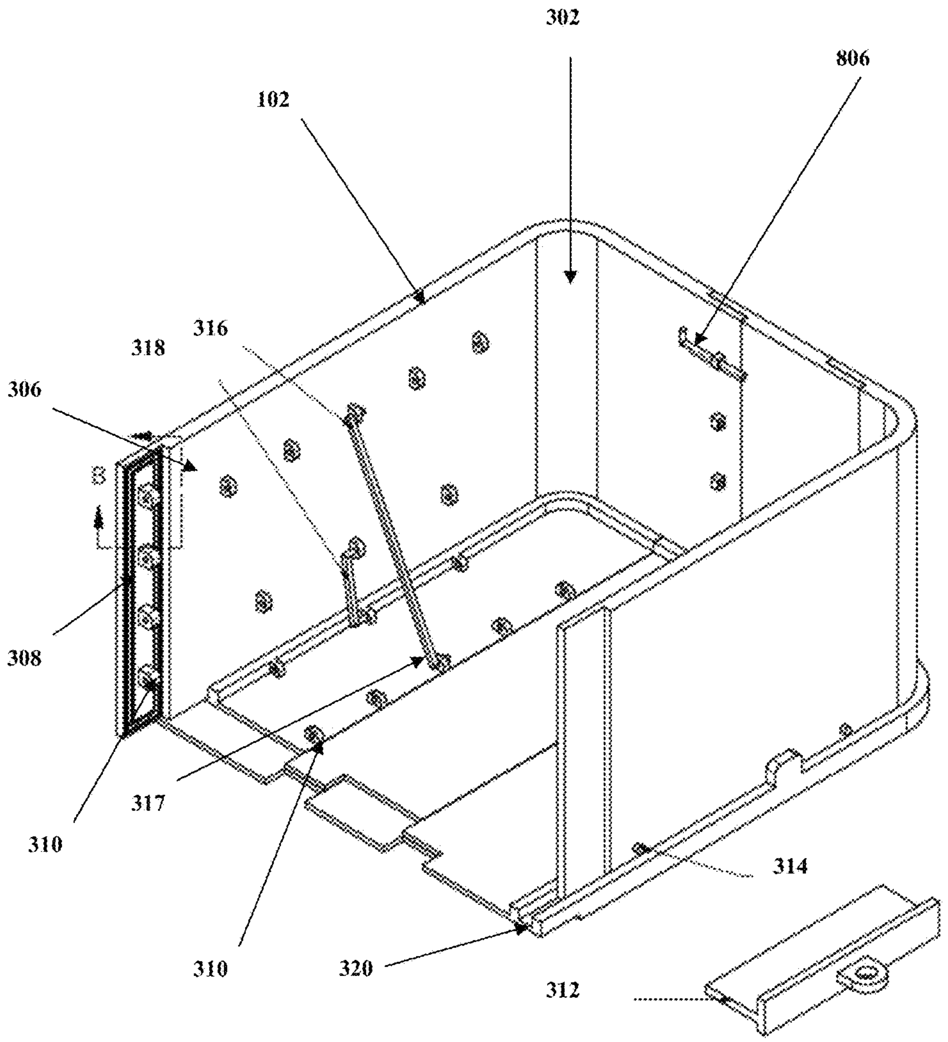
FIG. 3 shows a cutaway isometric view of a proposed flexible fluid tank, according to an exemplary embodiment of the invention.

When the tank system is shaped as a parallelogram, the walls are thus comprised of two or more curved members (102, 104, 128, 132) as well as zero or more straight members (130, 134). This becomes clear when looking at FIGS. 2A-2B, where we see the base 106 of a smaller tank made up of two interlocking/overlapping floor panels 202, 204, and the walls of two side wrap around panels (206, 208).

Extracting the fluids from the tank is critical. Fluid entry/exit from the tank may be accomplished in one embodiment via the use of one or more wall openings (110, 112, and 114) supplied along the side of one or more of the panels. As seen in FIGS. 11-14, in one embodiment, a pipe is fitted to the opening 110, and a manifold 1202 is placed at the end. In an alternate embodiment, a pipe may run straight to the unit pulling liquid from the tank to the unit itself.

The ability of such a tank to remain leak less and structurally sound resides primarily in the design of the joints between the panels, as well as in their securing to both each other and (in the case of the side panels) to the base channel. In one embodiment, the primary joint between the panels (whether side or floor) can be observed in FIGS. 3-10. In one embodiment, the side panel 102 has a curved portion 302 (although it may be straight or any other suitable shape), and joins at both ends 304, 306. In an alternate embodiment, a seal may be applied along all or parts of the joining 304.

Figures 7, 8:
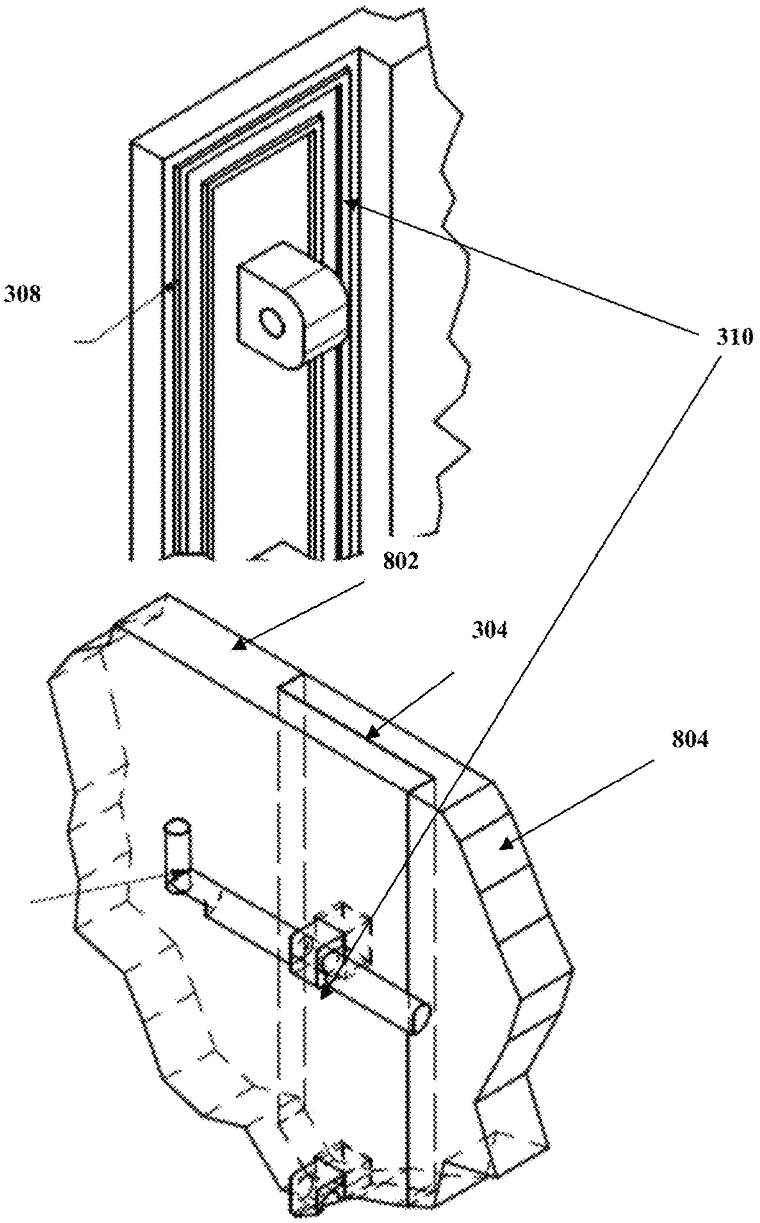
FIG. 7 shows a side view of the pin and hook interface along the walls/floors of the proposed flexible fluid tank, according to an exemplary embodiment of the invention.
FIG. 8 shows an isometric cutaway view of the pin and hook interface along the walls/floors of the proposed flexible fluid tank, according to an exemplary embodiment of the invention.
Figure 9:
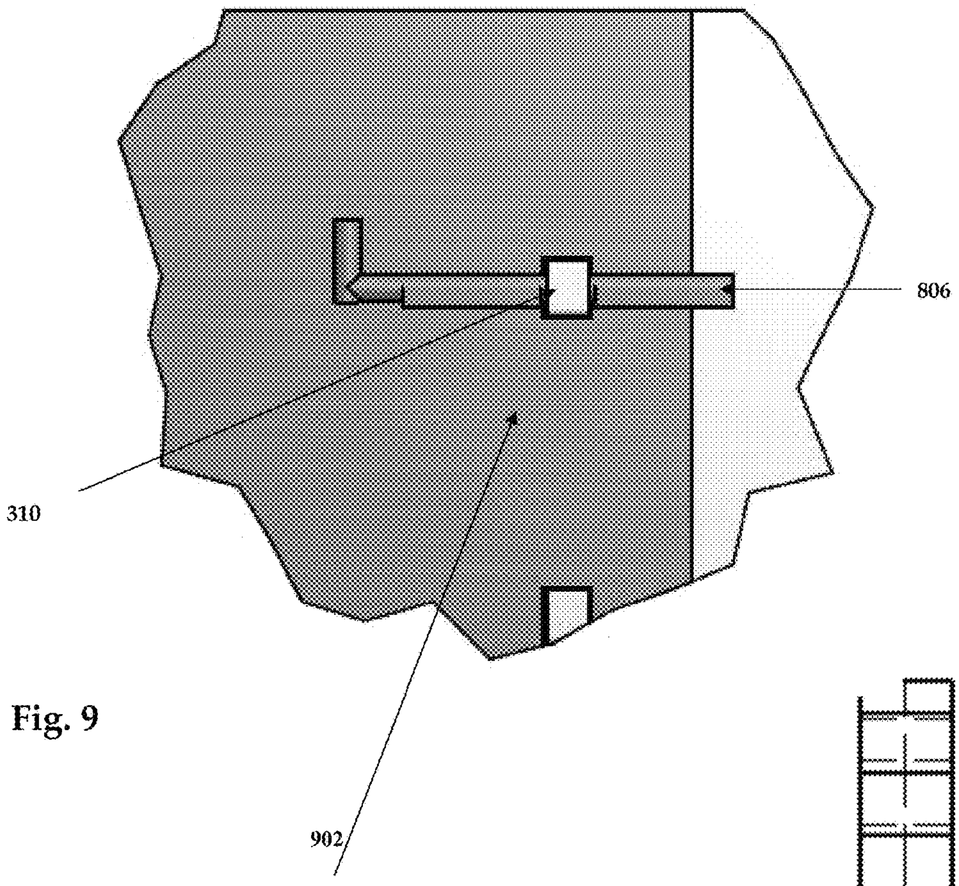
FIG. 9 shows a side front view of the pin and hook interface along the walls/floors of the proposed flexible fluid tank, according to an exemplary embodiment of the invention.
Figure 10:
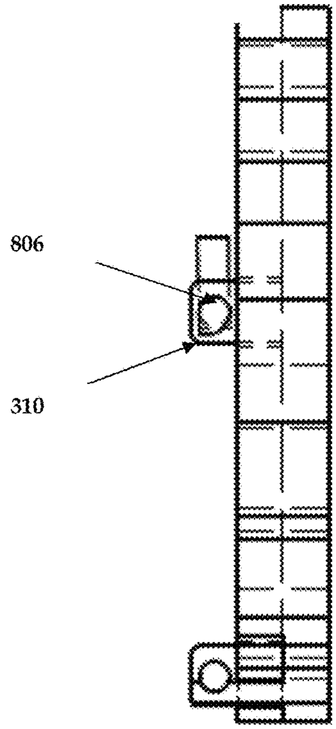
FIG. 10 shows a side cutaway view of the pin and hook interface along the walls/floors of the proposed flexible fluid tank, according to an exemplary embodiment of the invention.
Figure 13:
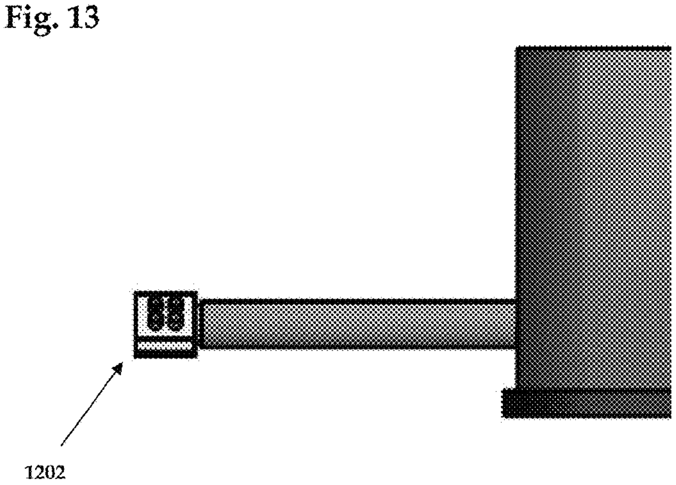
FIG. 13 shows a side view of a proposed flexible fluid tank, according to an exemplary embodiment of the invention.
Figure 14:
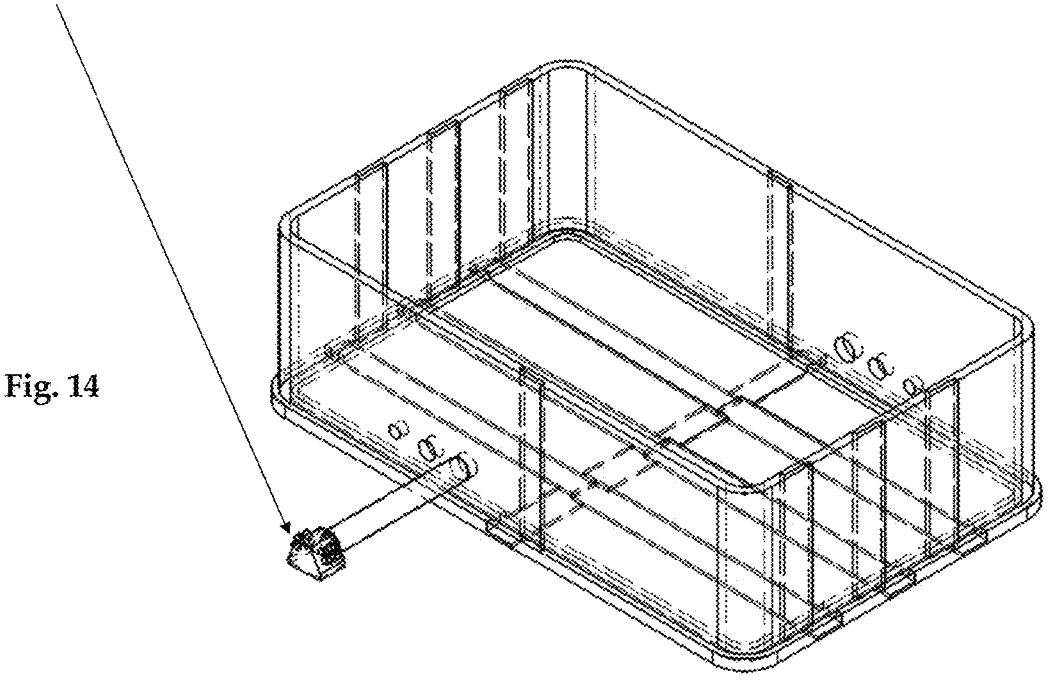
FIG. 14 shows an isometric view of a proposed flexible fluid tank, according to an exemplary embodiment of the invention.
Figure 15:
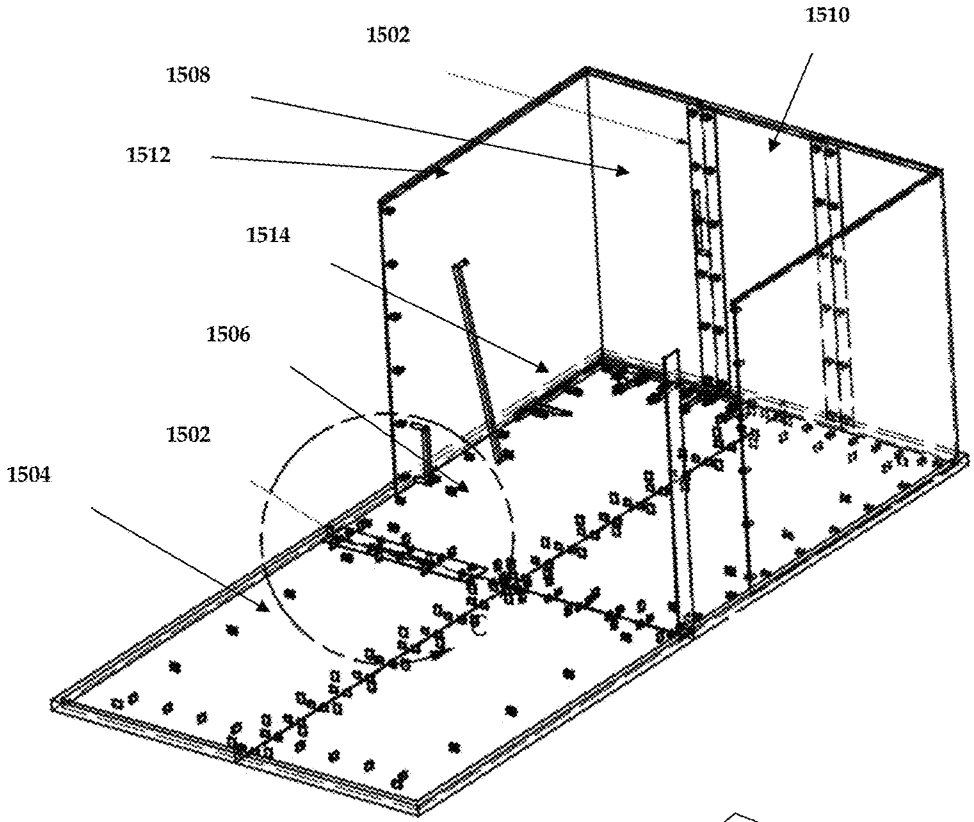
FIG. 15 shows an isometric view of a proposed flexible fluid tank, according to an exemplary embodiment of the invention.
Figure 16:
FIG. 16 shows a front view of a proposed flexible fluid tank, according to an exemplary embodiment of the invention.
Figure 17:
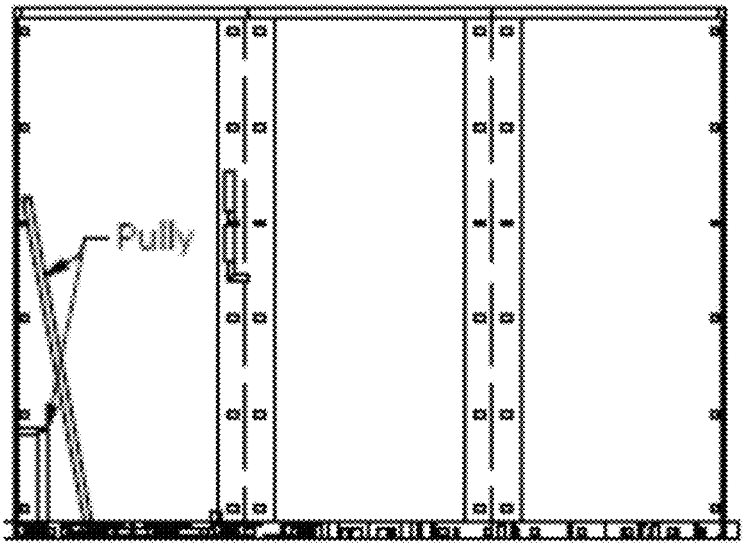
FIG. 17 shows a side view of a proposed flexible fluid tank, according to an exemplary embodiment of the invention.
Figure 18:
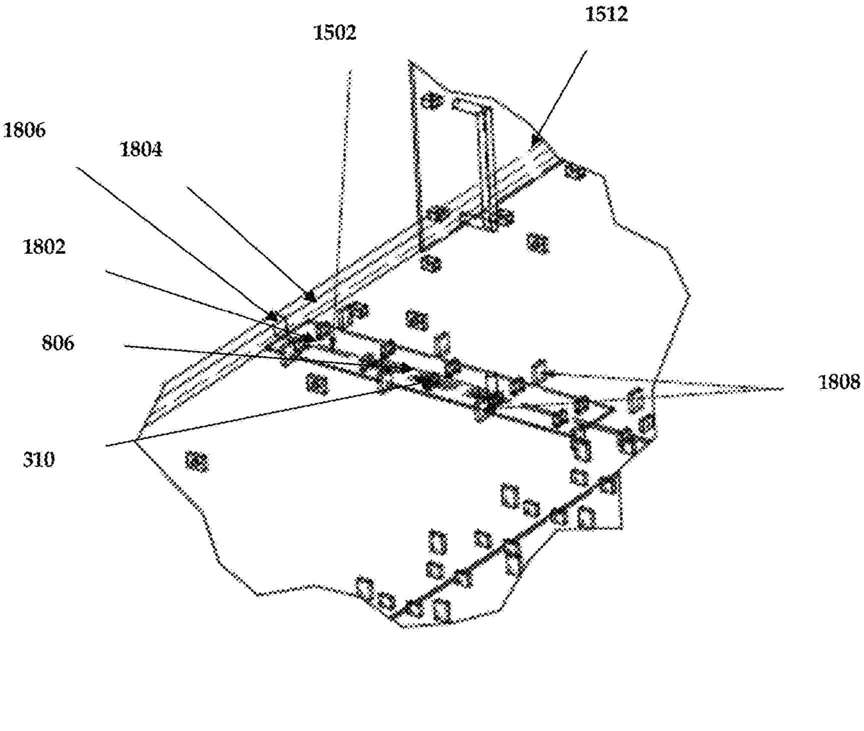
FIG. 18 shows a detailed view of the floor of a proposed flexible fluid tank, according to an exemplary embodiment of the invention.
Figure 19:
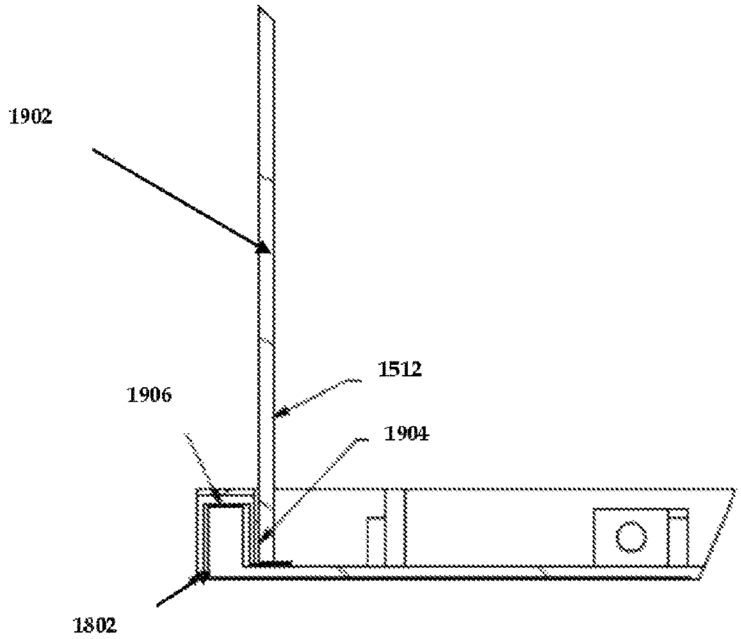
FIGS. 19-21 show side views of a proposed flexible fluid tank, according to exemplary embodiments of the invention.
Figure 20:
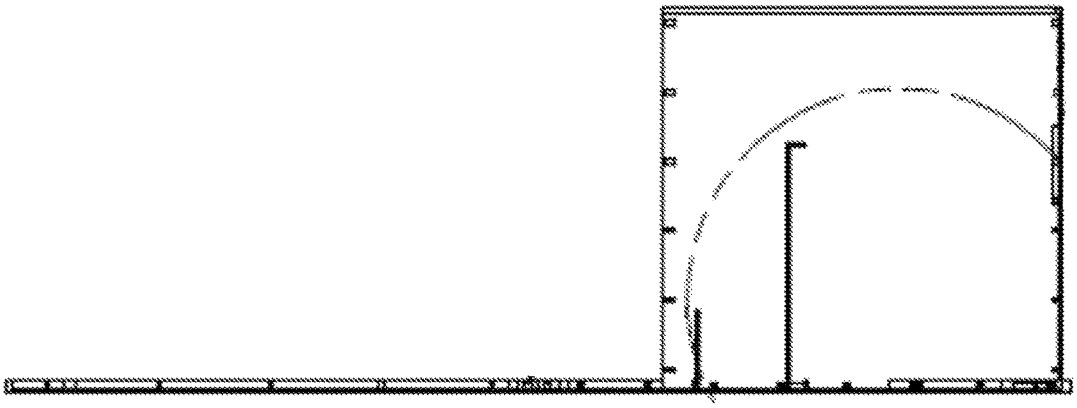
Figure 21:
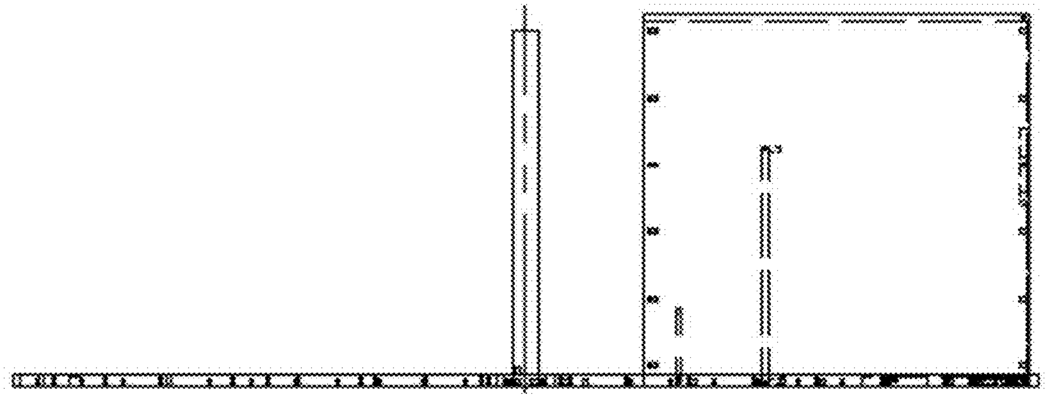
Figure 22:
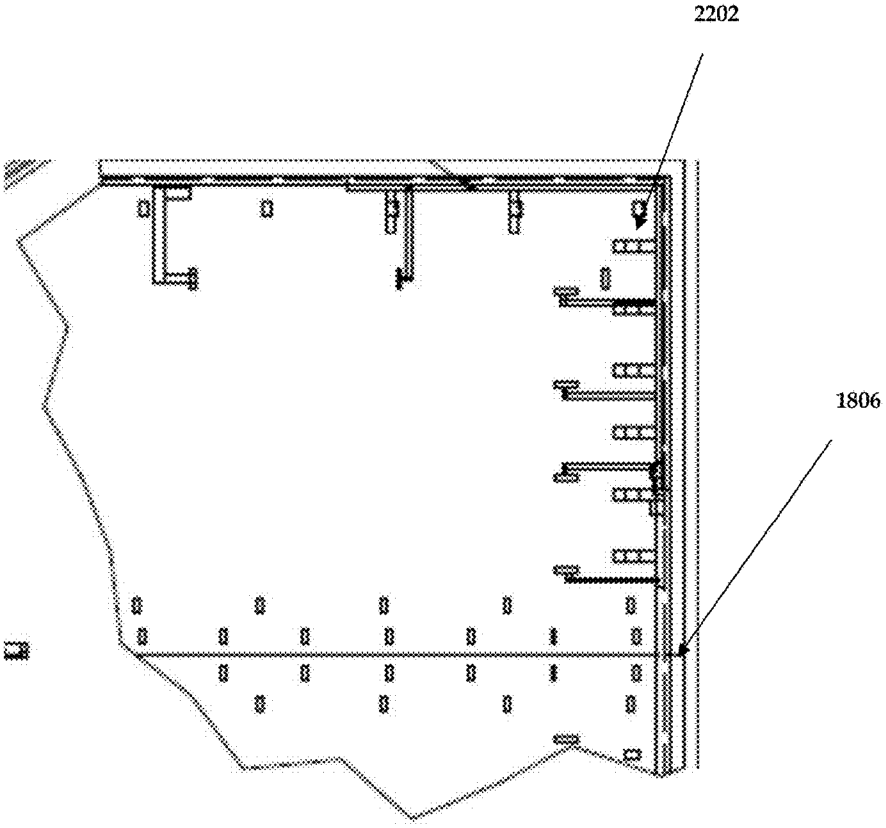
FIG. 22 shows a detailed side view of the proposed flexible fluid tank, according to an exemplary embodiment of the invention.
Figure 23:
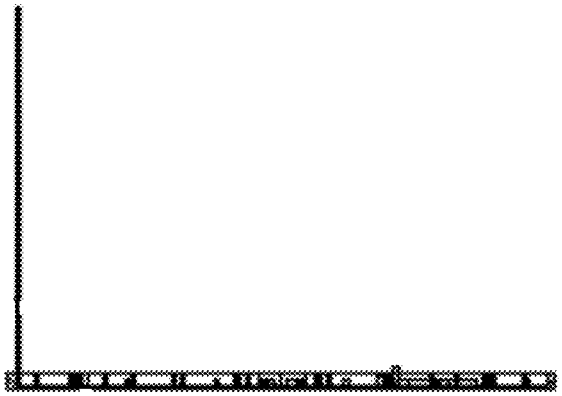
FIG. 23 shows a detailed side view of the proposed flexible fluid tank, according to an exemplary embodiment of the invention.
Figure 24:
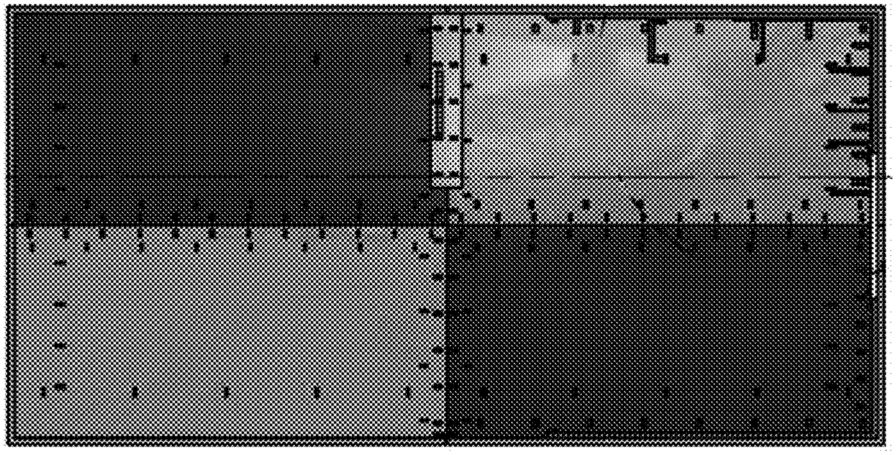
FIG. 24 shows a detailed view of the floor of a proposed flexible fluid tank, according to an exemplary embodiment of the invention.
Figure 25:
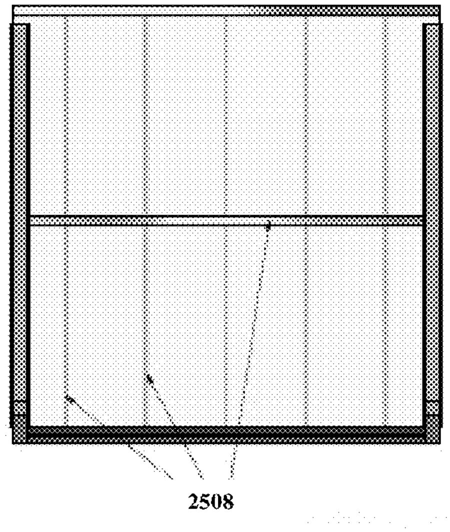
FIGS. 25-32 show various views of a composite proposed flexible fluid tank, according to various exemplary embodiments.
Figure 26:
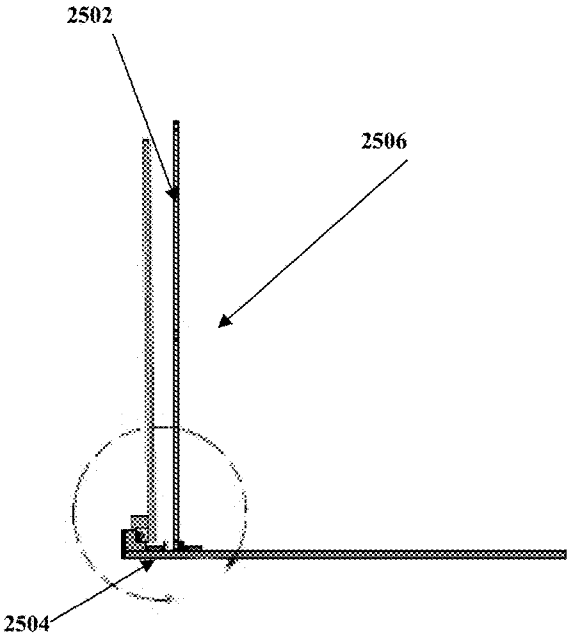
Figure 27:
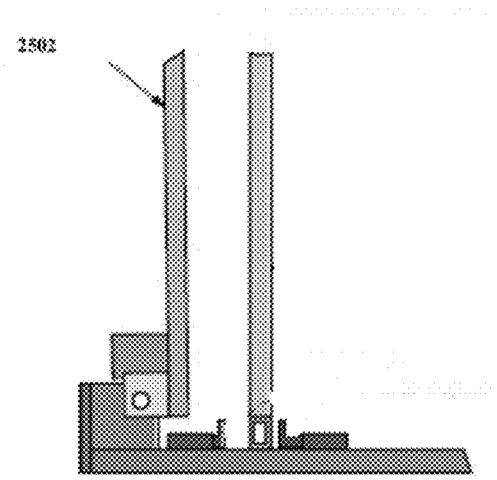
Figure 28:
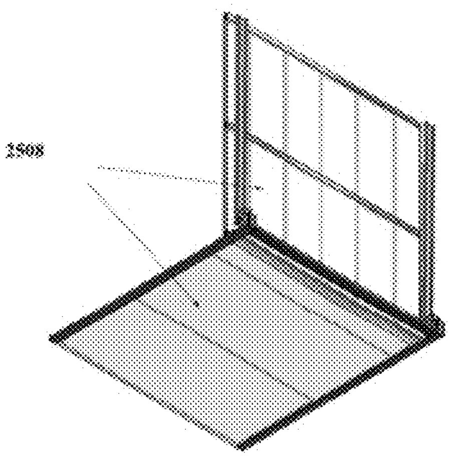
Figure 29:
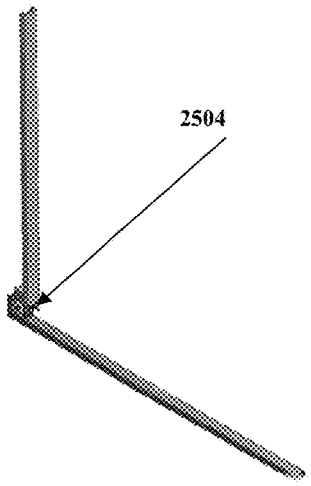
Figure 30:
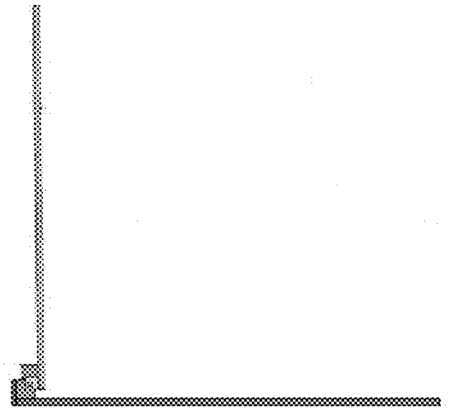
Figure 31:
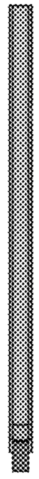
Figure 32:
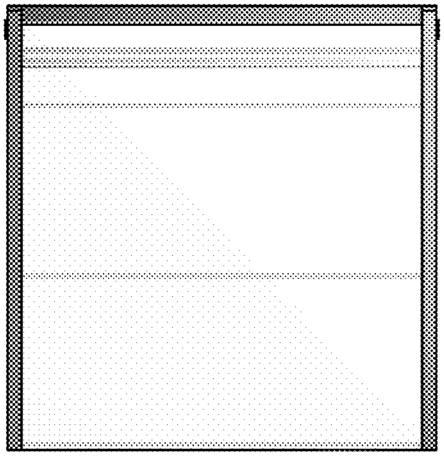
Figure 33:
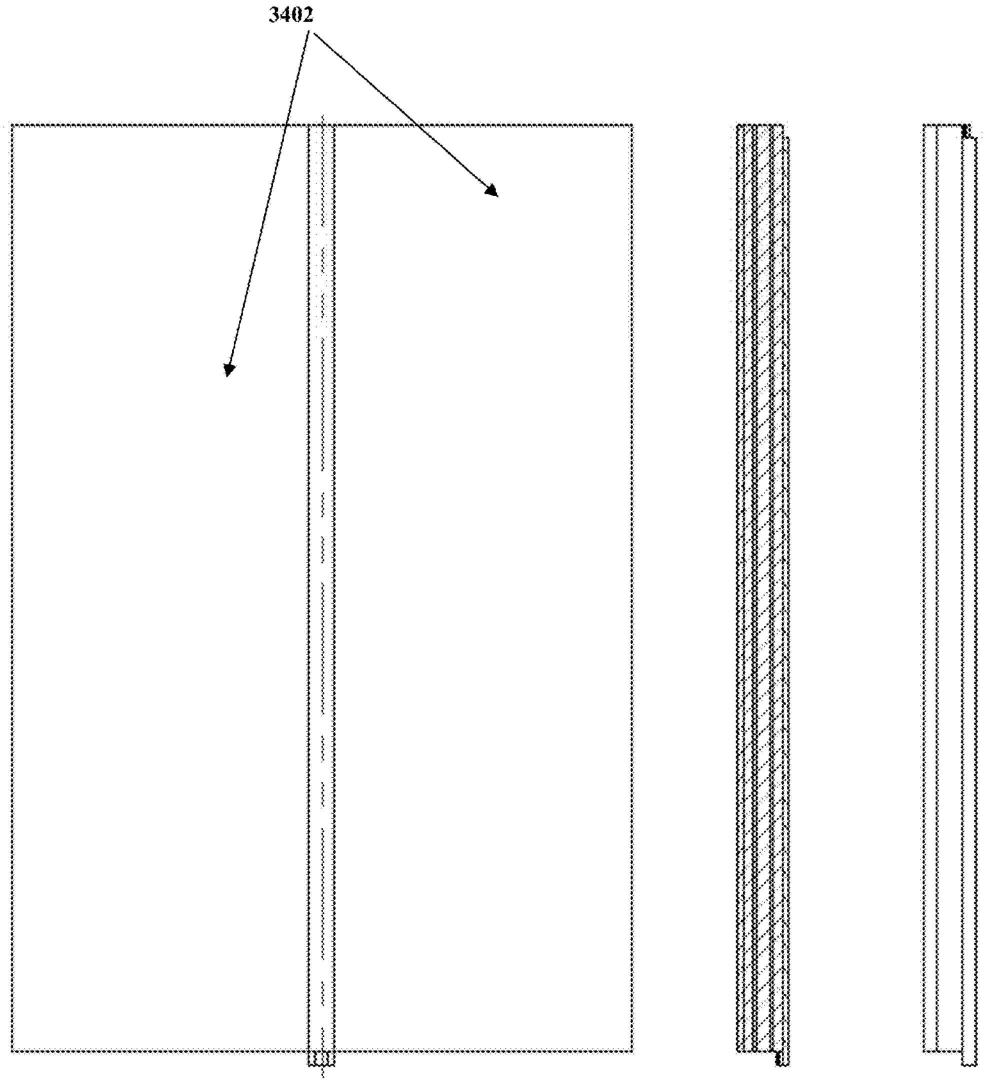
FIGS. 33-36 show various views of a panel for a composite proposed flexible fluid tank, according to various exemplary embodiments.
Figure 34:
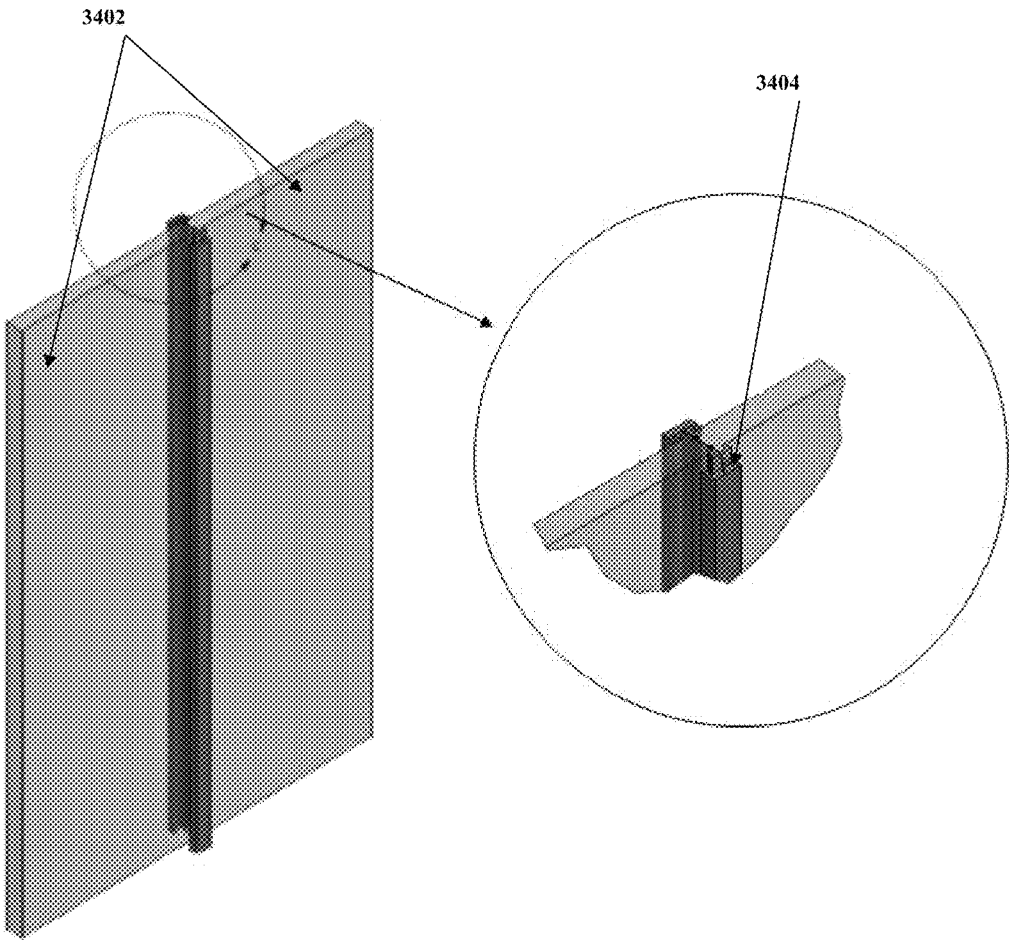
Figure 35:
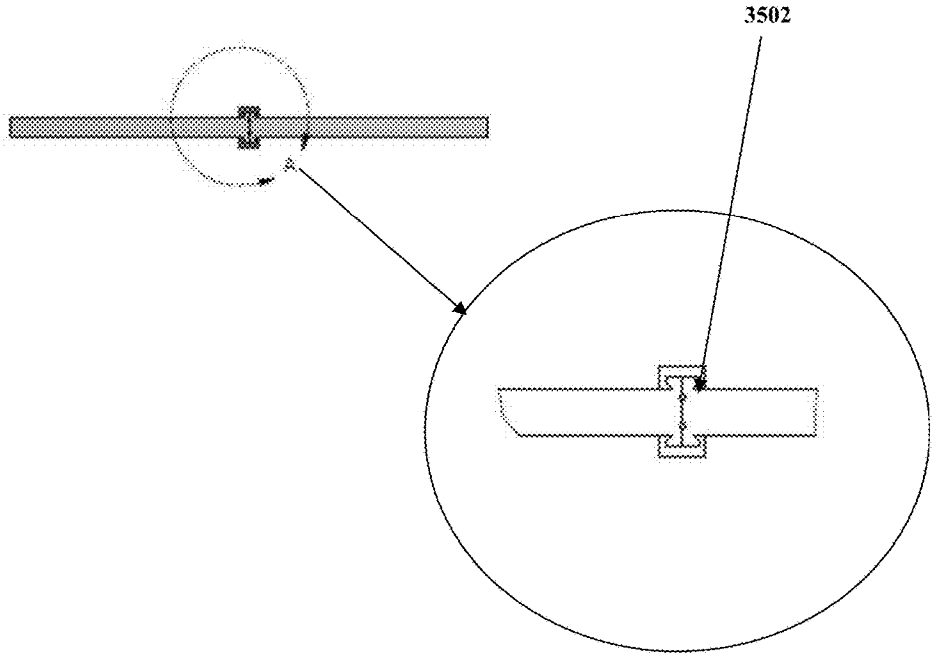
Figure 36:
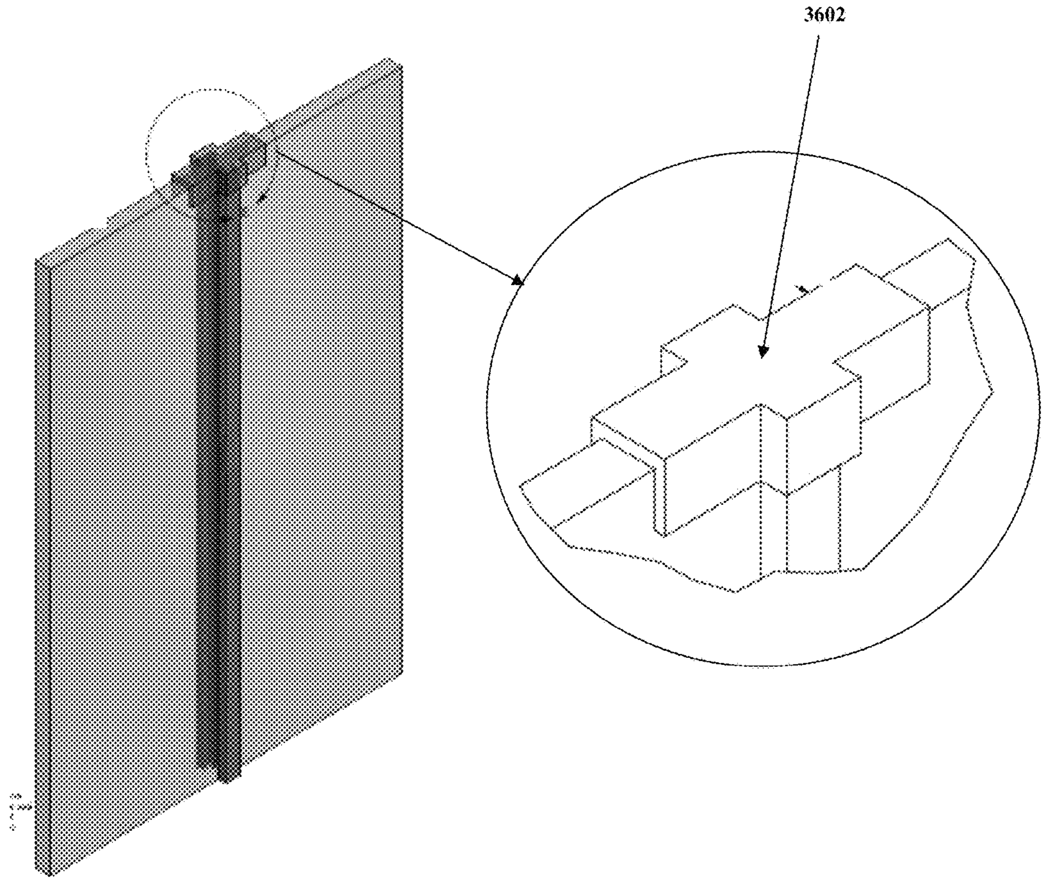
Figure 37:
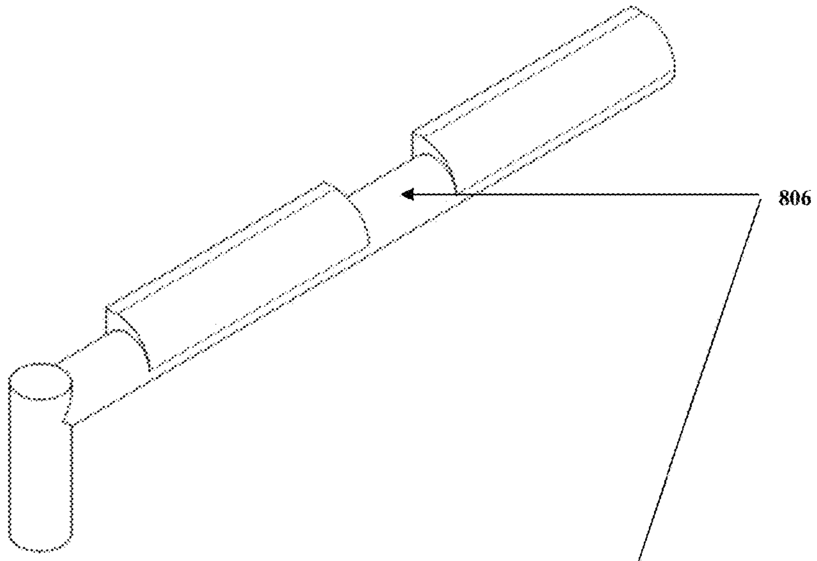
FIGS. 37-38 show various views of the pin, according to various exemplary embodiments.
Figure 38:
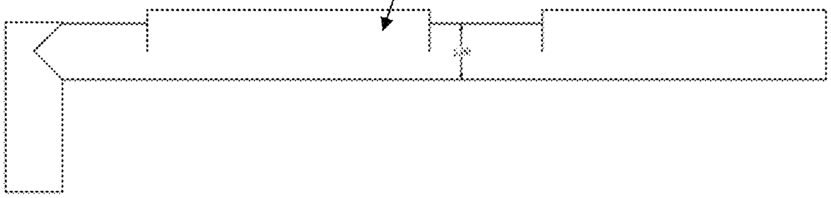
Figure 39:
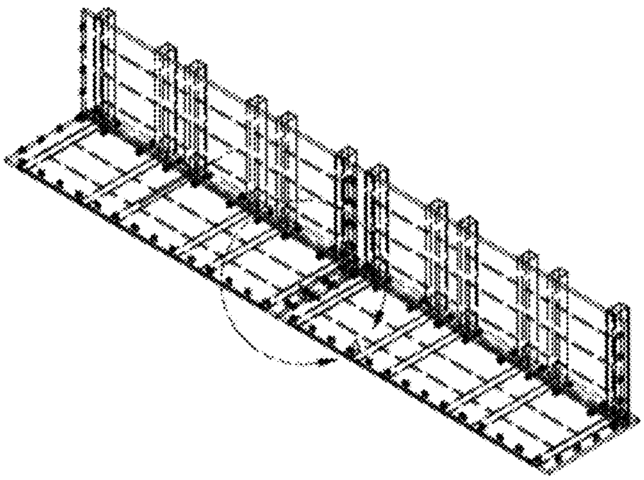
FIGS. 39-41 show various views of a large proposed flexible fluid tank, according to various exemplary embodiments.
Figure 40:
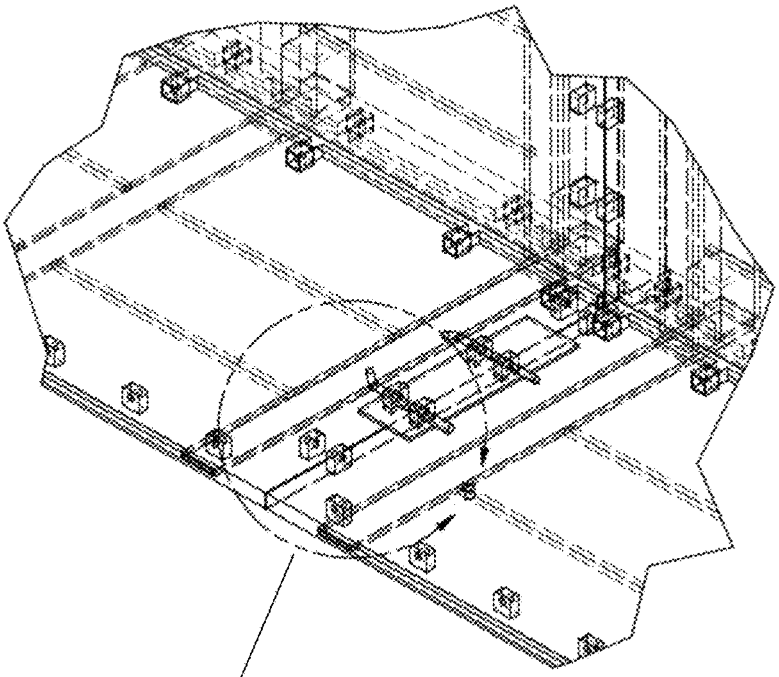
Figure 41:
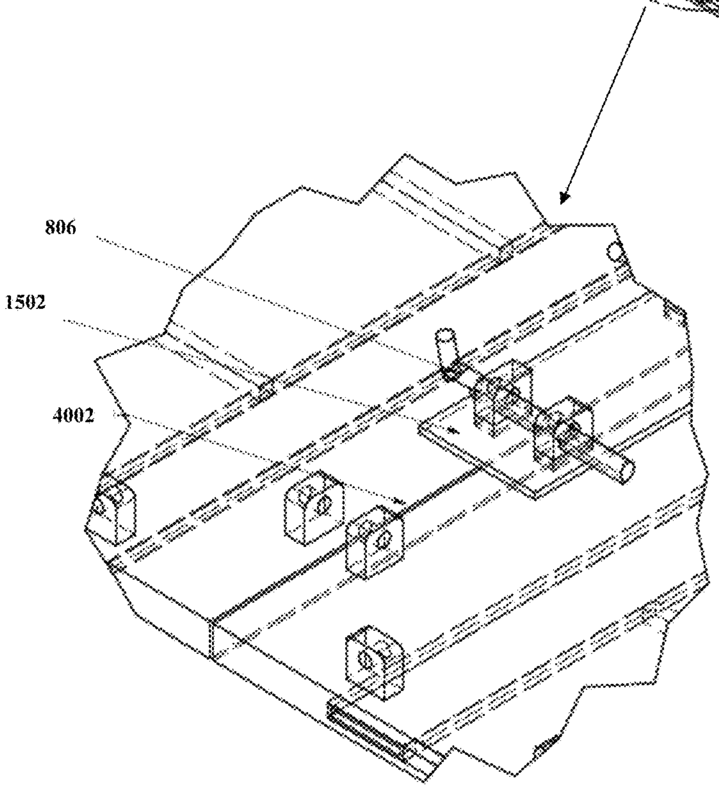

A gasket, O-ring, silicone weld, rhino liner or seal 308 runs around the area of the joint, with one or more loops 310 being located inside the joint, in order to seal the insides of the joint to a matching partial depth joint which has a matching number of openings designed to allow the loops to go through them and be secured with a pin 806. Referring to FIG. 8, we see the outside joint 304 in detail. Matching side 802 has the openings, so that when the side with the loops is placed against it, the loops 310 go through the openings. Sealing and mechanical securing is accomplished by the insertion and rotation of a pin 806.

The cross section shows one embodiment in which the shape of the pin 806 is elliptical within a circular opening in the loop 310. Thus, rotation of the pin allows pressure of the seal(s) to each other. Other implementations may include screws/nuts, and any other suitable mechanical pressure means. Additionally, welding of one or more of the pins, or securing via separate mechanical means (like a latch) may be used. In an alternate embodiment, the panels may be designed so that all the latches are on the outside or a combination. A design with all of them internally is preferred, for vandalism minimization reasons.

Note that while the gasket 308 is shown on the side with the loops, in alternate embodiments they may be located on either the joint side with the loops, the slits or both. Similarly, the sealing function of the gasket may be accomplished with a grooved facet, allowing the use of an O-ring arrangement. The gasket, seal or O-ring may also be manufactured from such polymers, silicone, natural or synthetic rubber, leather, etc. More information on proper O-ring materials and design can be found on the Parker O-Ring Handbook (ORD 5700) the contents of which are incorporated herein by reference.

Figure 4:
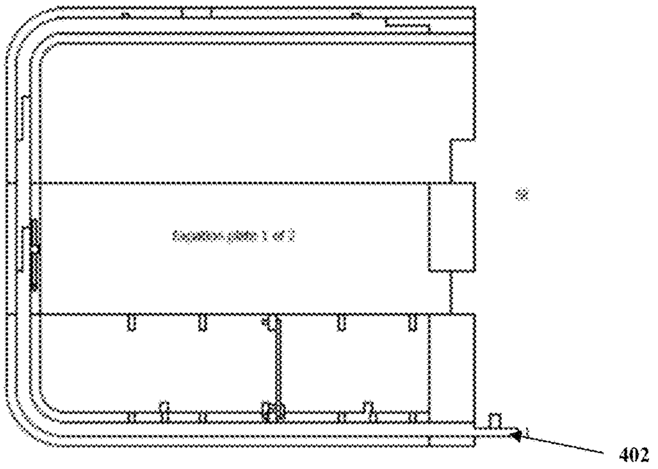
FIG. 4 shows a side view of a proposed flexible fluid tank, according to an exemplary embodiment of the invention.
Figure 5:
FIG. 5 shows a side view of a proposed flexible fluid tank, according to an exemplary embodiment of the invention.
Figure 6:
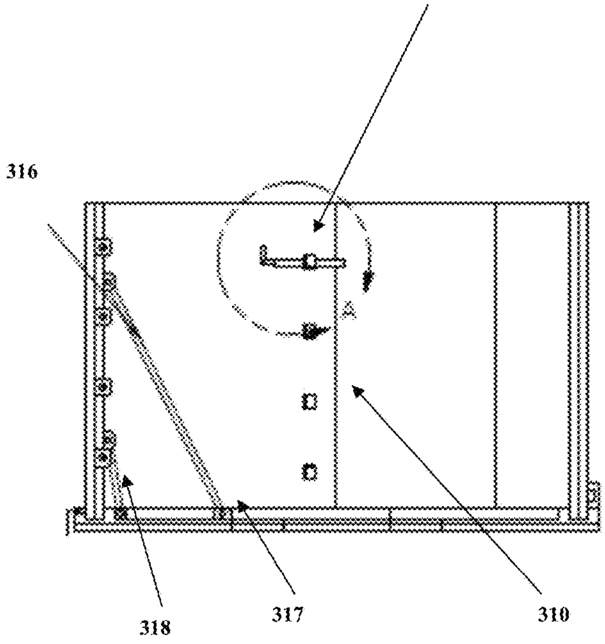
FIG. 6 shows a cutaway side view of a proposed flexible fluid tank, according to an exemplary embodiment of the invention.

The floor panels 106 secure the same way, with pins within the loops 310 in the floor. Optional a pulley 318 and pulley arm (top 316 and bottom 317) may be used to connect to hooks 310 provide additional structural linkage strength between floor 120 and side 102 panels. The sealing means between the wall panels and the floor panels is accomplished in one embodiment via a groove or channel 320 within the base panels that may also be equipped with a similar seal, gasket or O-ring (to 308) to ensure the base-wall interface sealing means for the interface between the floor and wall. In another embodiment, we teach a similar arrangement groove 402 as seen in FIG. 4. Optional extra sealing may be applied around some of the corners, which may be accomplished by any caulking means familiar to those skilled in the art. Optional Jack lifts 314 and support plates 312 may be provided. The plates 312 may be inserted along portions of the channel 320 in order to have more support.

In an alternate embodiment, shown in FIGS. 15-24 and 39-41, a seal panel 1502 is used to strengthen the joining area between floor panels (1504, 1506) or wall panels (1508, 1510). Built in a similar fashion to the wall joints 308, this sealing panel 1502 has a complementary seal to that of the joint 308, minimizing or eliminating the leaking of the fluids within the structure, while providing structural integrity.

As with the floor matching, in one embodiment, the wall interlocking and sealing means and appropriate surface matching is accomplished through nubs or hoops 1802 that are attached to the outside panel/wall (1504, 1506, 1508, 1510) and go through the openings in the matched interface plate 1502 so that the sandwich of both acts as the sealing means that creates a seal between the floor (or wall) sections, so that when they are then pressed together through the insertion and rotation of a pin 806 on a loop 310 in one or more locations pressure is created against the sealing means within said panel sandwich loaves. Similar pressure may be accomplished by a nut/screw or other suitable mechanical linkage. In all cases, it is critical that these mechanical attachments (pin/nubs, nut/screw, etc.) be removable via simple mechanical action, preferably accomplished by a human with light or no tools.

In many cases, there is a risk that forces acting on the tank may cause one or more floor panels (or wall panels) to attempt to displace against each other, causing leaks. In one embodiment, a pintle, pulley, turnbuckle or other tension fitting 1808 may be used to provide forces to hold both the floor and side walls panels together against such leaks as well as holding them down. In one example related to the floor, at the joint where two floor plates meet 1806, a second seal 1906 is accomplished via a seal that doubles back or a gasket type seal vertically to ensure the sealing of the joint. Said second seal 1906 rests either above or below the primary seal 1904.

To reduce or eliminate such forces, a pintle, match, turnbuckle or similar mechanism may be used. The sealing plates or panels 1502 cover the entire floor joint, where a T-shaped seal 4002 is used in its entirety or portions thereof. They operate similarly when sealing the wall joints, be they between walls 1508, or between walls and extension plates 1510.

In another embodiment, the sealing means around the lower perimeter of the walls (where the walls 1508 meet the bottom plates 1506), may be accomplished in a twofold fashion. The bottom plate 1506 is built with a built in rim 1804, against which the wall's 1512 outside surface 1902 presses. A seal 1904 is laid along the bottom, sandwiched between the inside surface of the rim 1802 and the outside perimeter 1902 of the wall 1512.

In an alternate embodiment, an L-shaped seal is used, so that the seal will extend past the bottom of the wall, and be viewable by the installer, minimizing the chances of it being installed incorrectly. The sealing along the base is structurally finished by the addition of a sliding rail 1514 that is laid along the inner perimeter of the tank and presses the walls 1512 against the rim 1804 via the use of a turnbuckle, pushing rod, pushing screw, or some other pressing feature 2202.

Referring to FIGS. 25-32, we see an exemplary embodiment wherein the walls 2502 of the tank are made foldable through the addition of a hinge 2504 at the base, making it easier to transport and store. The hinge 2504 may be implemented as either a 90 degree or L hinge, or a completely foldable 180 deg. one, since in either case, the strength of the wall will be a combination of the hinge 2504 and of the walls interconnection as described above.

In an alternate embodiment, a second, internal liner composite surface 2506 is placed on the inside of the wall 2502 allowing for a composite sandwich 2508 of vertical and horizontal lines strengthening lines (be they made of plastic, carbon laminates of other composite form). The lower portions of the walls (2504, 2506) are held in place by one or more pressure fitting 2510.

Referring to FIGS. 33-36 we see an embodiment of the system that may be accomplished using panels made of various materials. These materials may be comprised of all or parts of metal (both ferrous and non-ferrous), wood (including composites such as particle board and compressed wood chips), Aerogel, Silica Aerogel, Aerographite, Glass, Synthetic fibers, Nanowire, Nanowires, nanotubes, Nanocellulose (including Nanocellulose Algae), Nanocellulose Aerogels, Grapheme, Grapheme Paper, Grapheme phoneme, Metallic Glass, Shrilk, Geofill Cellular Concrete, foam, polystyrene, fabricated expanded polystyrene, High Density polystyrene, Structural High Density EPS (polystyrene) and/or expanded polystyrene, concrete, fiberglass, carbon composites, etc.

In an alternate embodiment, the panels are manufactured as a composite core panel formed from a honeycomb panel formed with tubular cells at right angles to the panel where the panel is filled with reinforcing foam 7202 extending through the cells so as to provide an enhanced compression strength of the core in a direction longitudinally of the cells. The materials commonly used for the honeycomb panels are phenolic paper, aluminum and various types of plastic materials. The selection is made in part dependant on cost relative to the desired strength with the aluminum of course providing the highest strength at the highest cost.

Phenolic paper is the simplest and cheapest option and is very widely used. The honeycomb, in many cases, is formed by bonding strips side by side with the tubular cells formed around rods or simply by stretching the bonded strips longitudinally of the panel to open them up. Adhesive and heat sealing can be used for attaching the strips.

The panels 3402 may be linked together with a rail-style clamp 3404 that locks them together. In one embodiment FIG. 35, an optional seal may be fitted within a groove 3502 if required. These clamps may be pushed together FIG. 36 with a press fit 3602. As an additional measure, the panels may be capped by a connector clip or cover.

Figure 42:
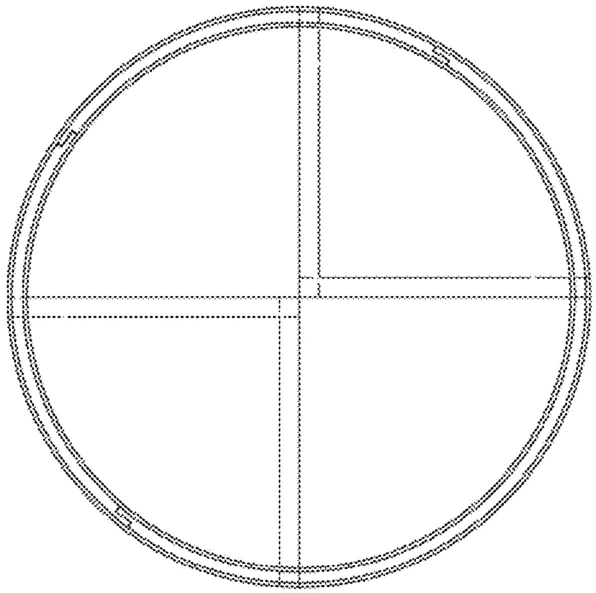
FIGS. 42-44 show various views of a round proposed flexible fluid tank, according to various exemplary embodiments.
Figure 43:
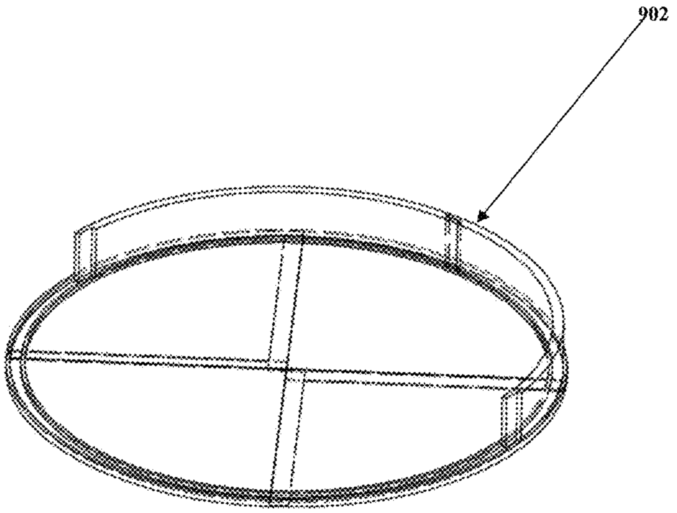
Figure 44:
Figure 45:
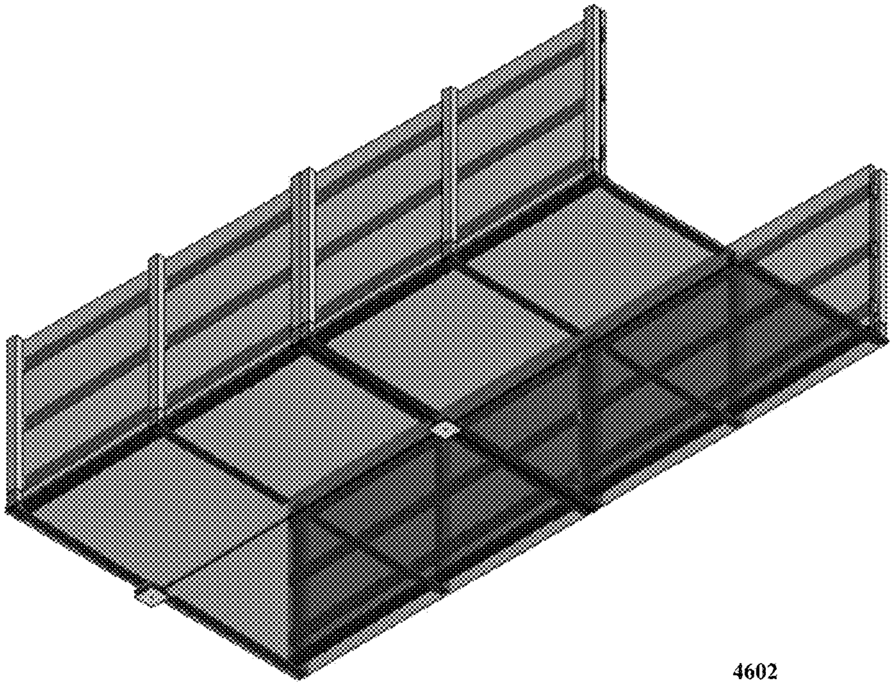
Figure 46:
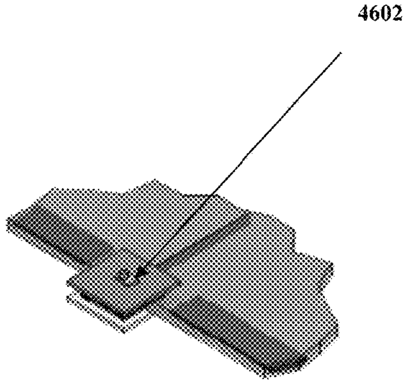
Figure 52:
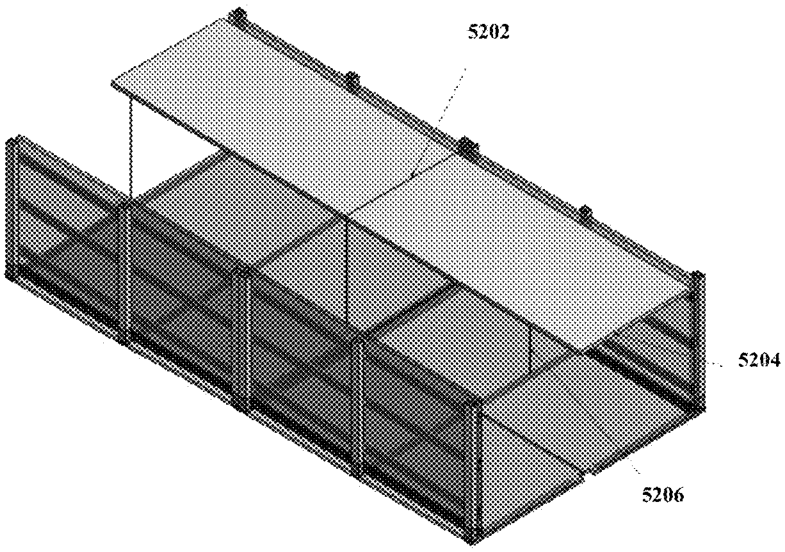
FIGS. 52-55 show various views of a proposed roof for a flexible fluid tank, according to various exemplary embodiments.
Figure 53:
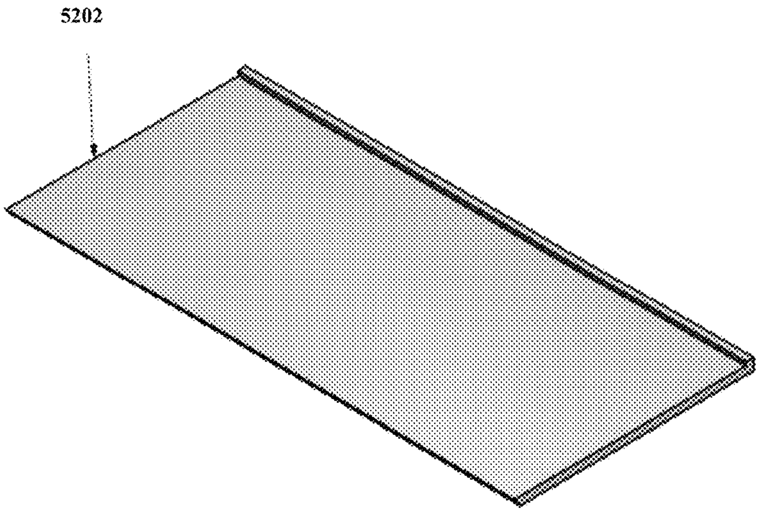
Figure 54:
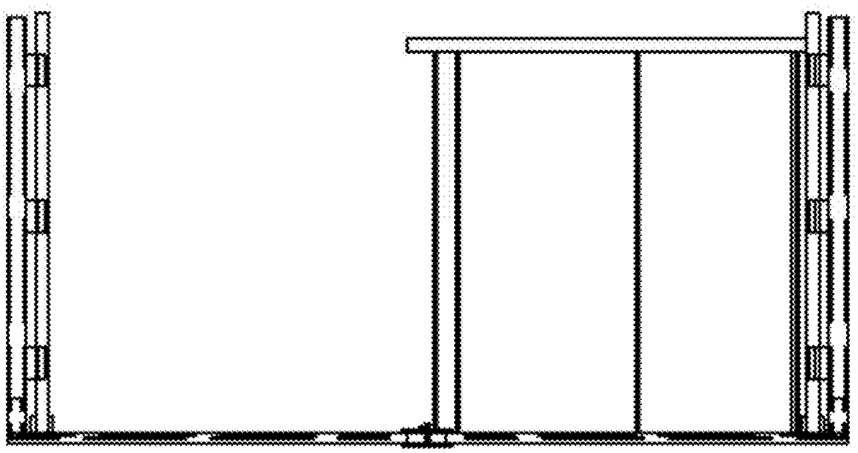
Figure 55:
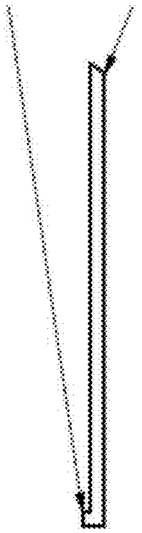
Figure 59:
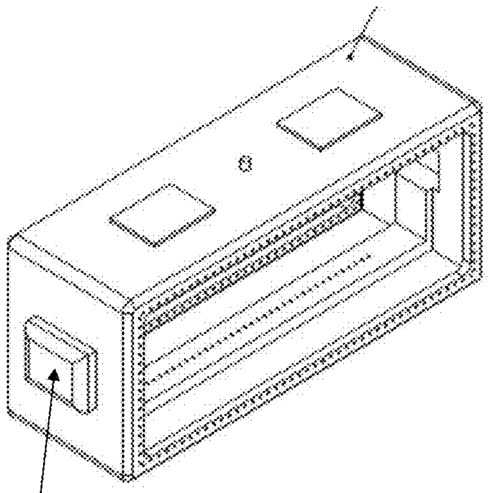
Figure 60:
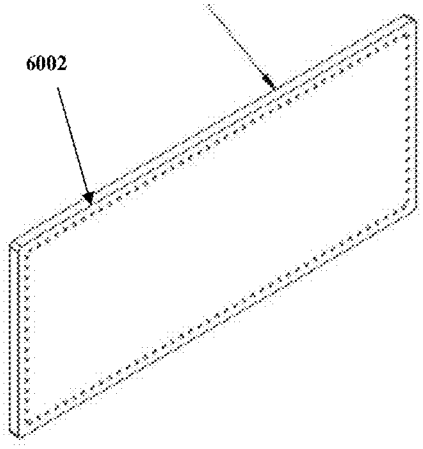
Figure 61:
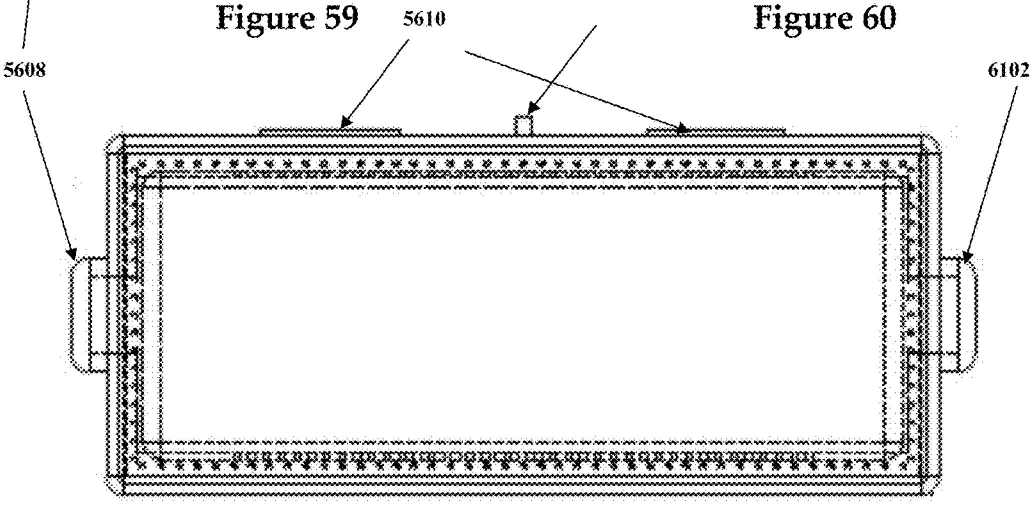
Figure 66:
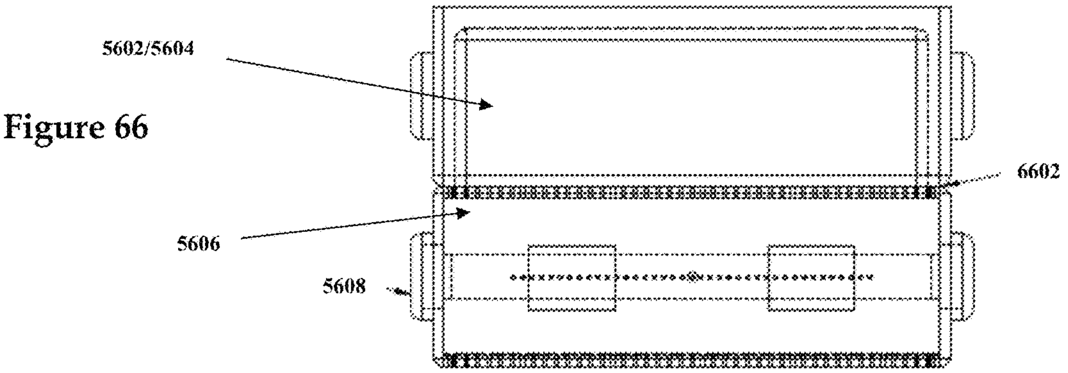
Figure 67:
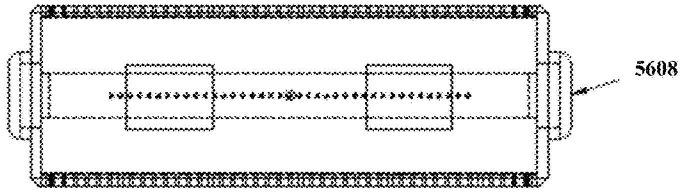
Figure 68:
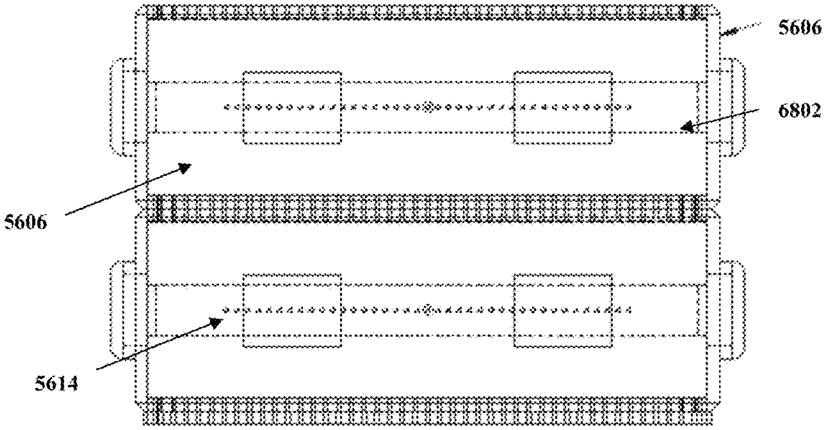
Figure 69:
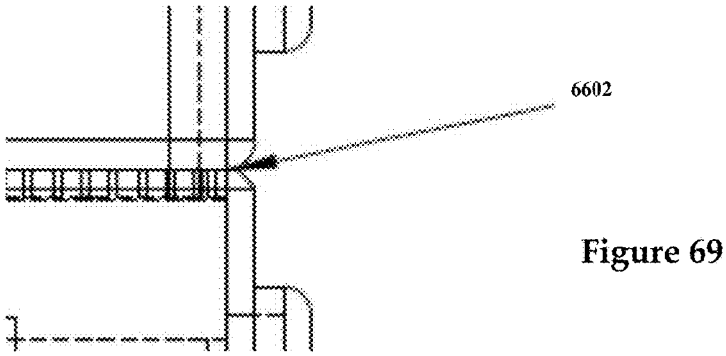
Figure 70:
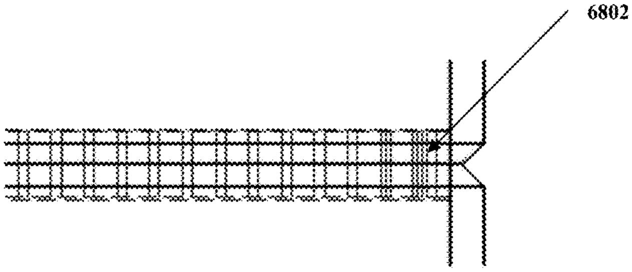
Figure 71:
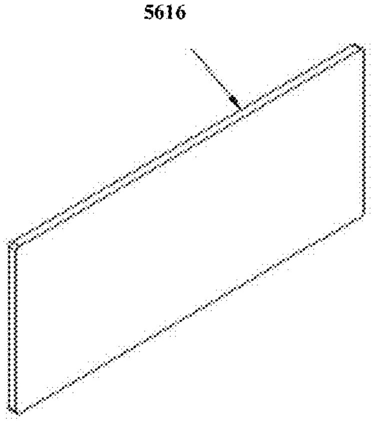
Figure 72:
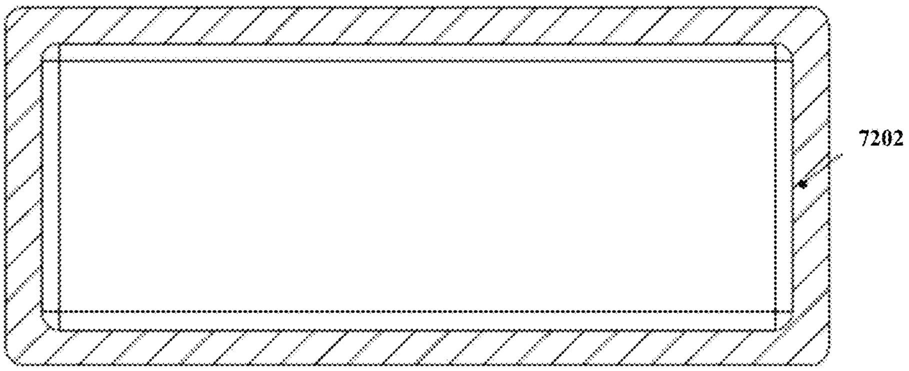
Figure 73:
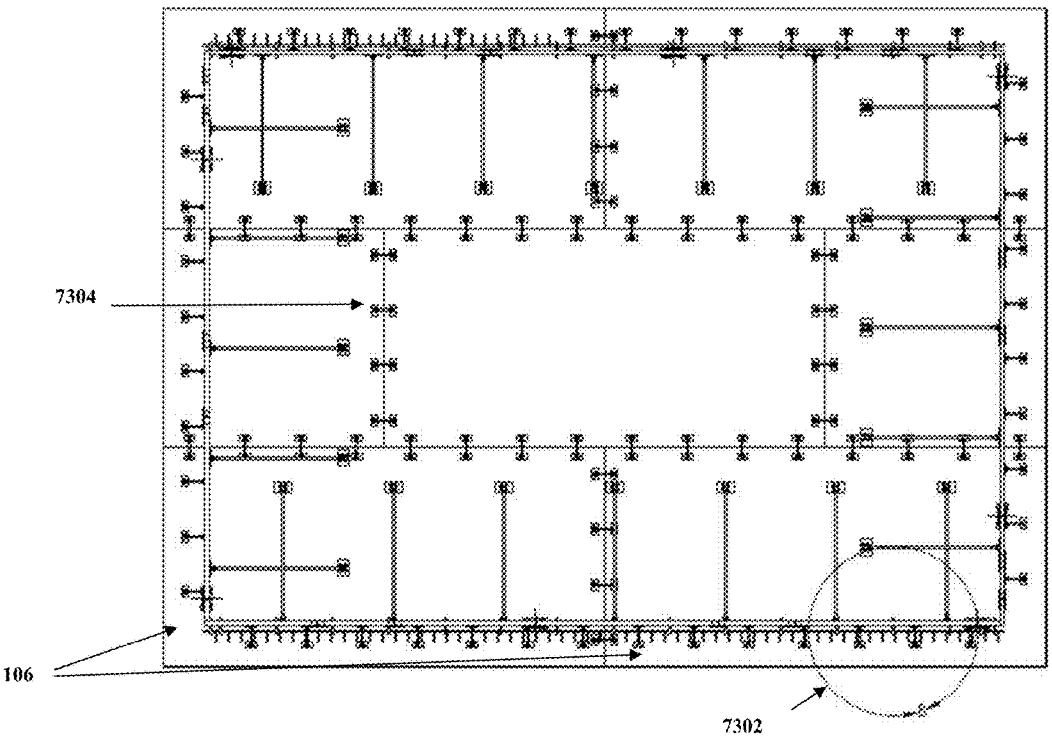
Figure 74:
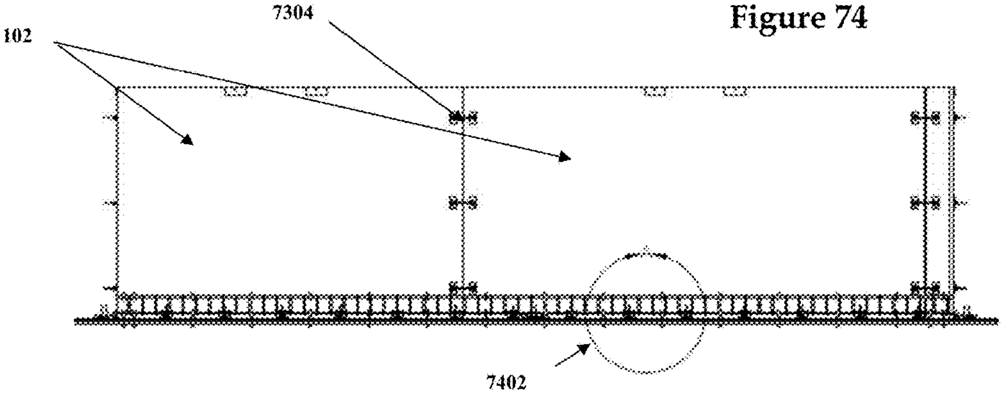
Figure 77:
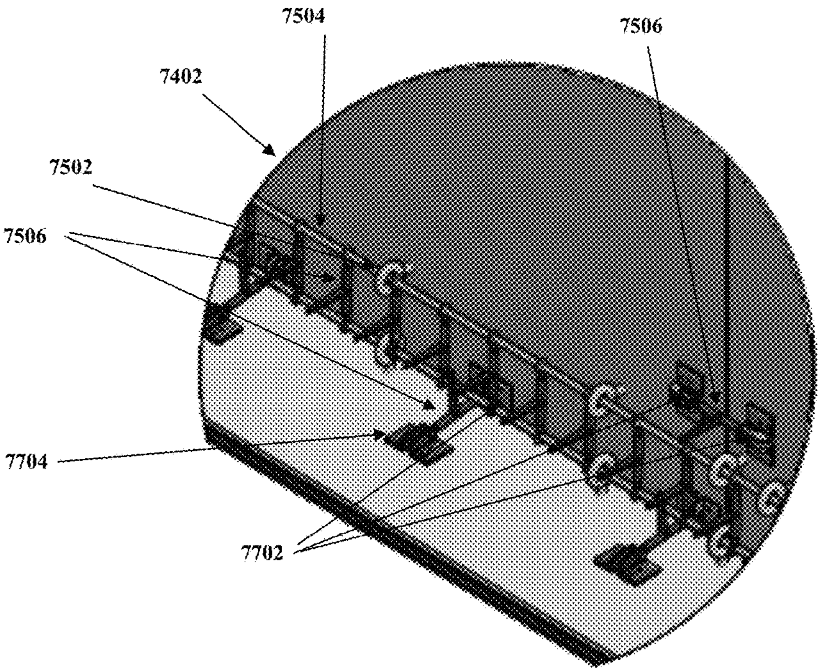
Figure 78:
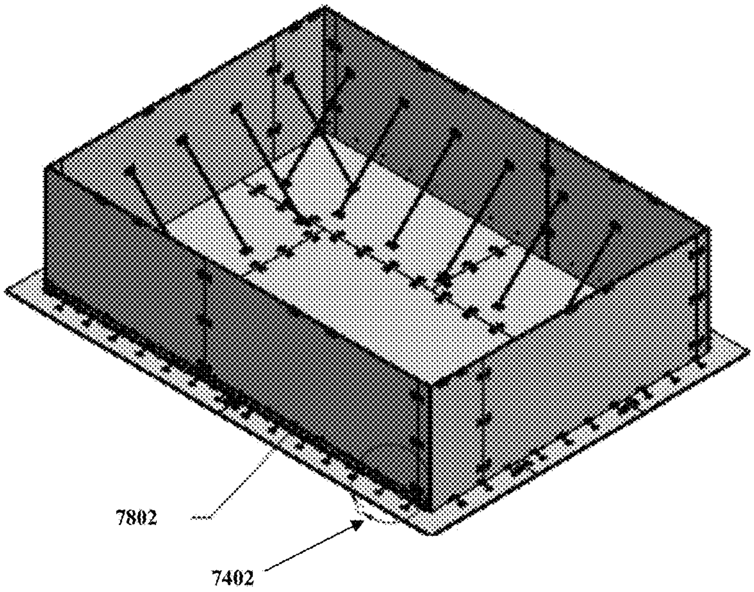
Figure 79:
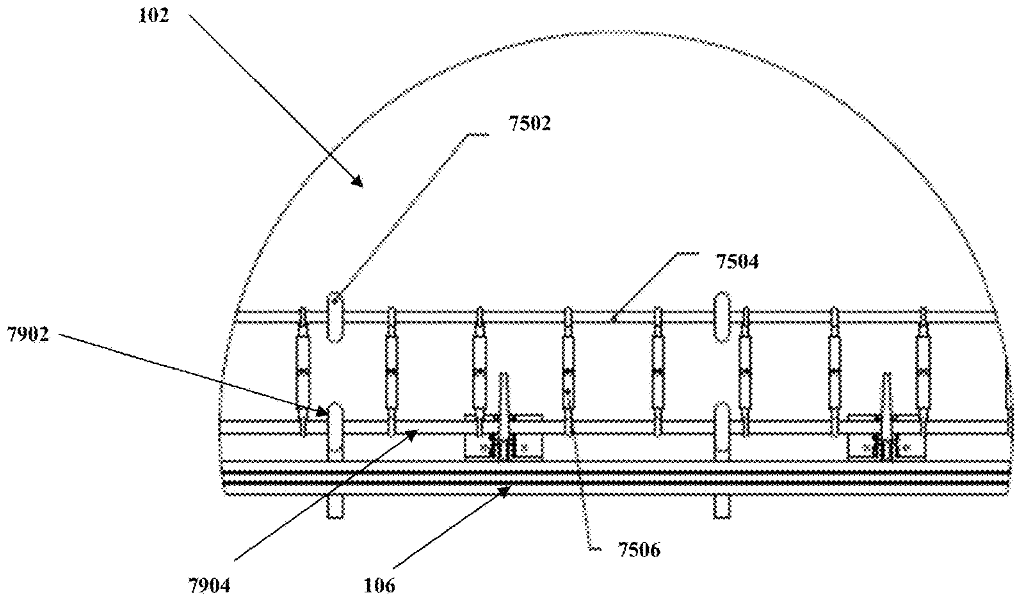
Figure 80:
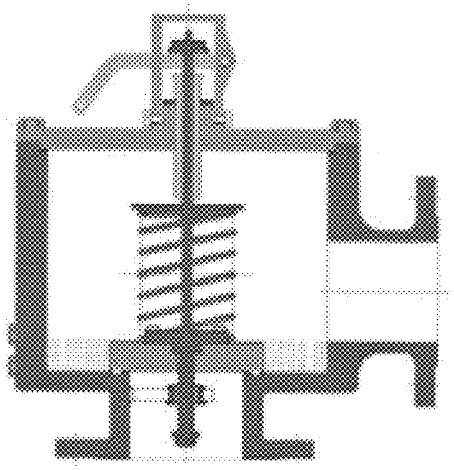
FIGS. 80-83 show various views of pressure relief and safety valves components.
Figure 81:
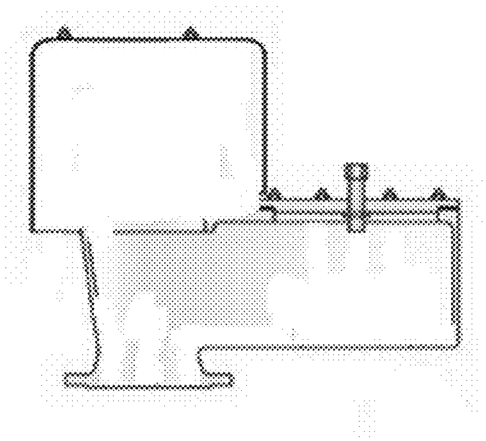
Figure 82:
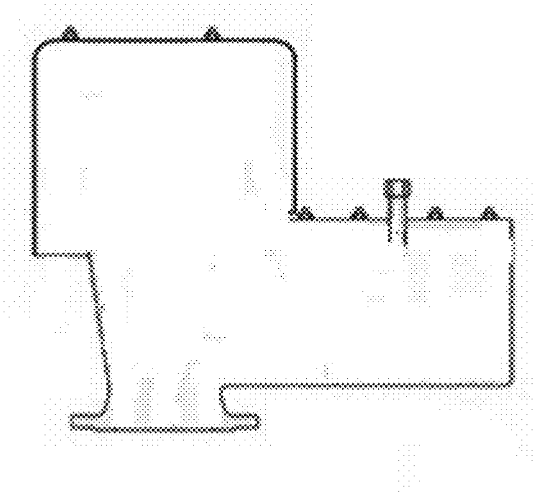
Figure 83:
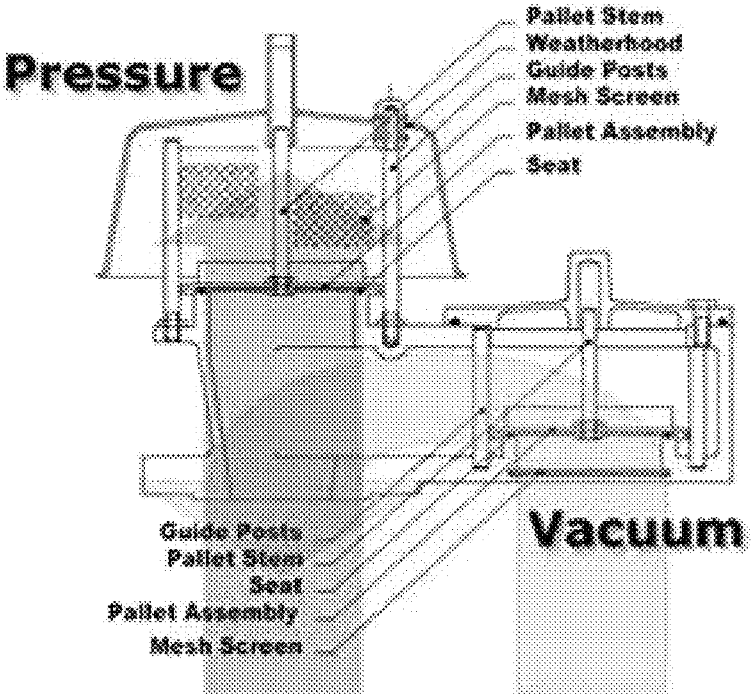

As seen in FIGS. 42-44, the unit may be circular shaped, in one embodiment, the walls are circular, with appropriate interlocking means 902 along the wall. In one embodiment, these interlocking means are pin 806 and hook 310 with or without a gasket or O-ring.

In another embodiment FIGS. 45-51, we see a flexible fluid tank embodiment where the base panels and their sealing means (be they O-ring or other seals) are joined or attached to those of other panels (in both X and Y direction, i.e. along the length and width of said base panels) through an seal interface joining mechanical pressure fitting 4602 that is capable of joining the seals or T-seals from two or more directions. Such a fitting 4602 may be in one embodiment square/rectangular, but any other suitable shape is possible, as long as its area overlaps those seals areas to be covered.

Such a mechanical pressure fitting 4602 is but one embodiment. In one embodiment, such a fitting 4602 is comprised of a compression seal 4702, a compression lever or nut 4704, an upper compression plate 4706 and a lower compression plate 4708. The edges may be embodied as a channel, or as a double seal FIGS. 25-32. In this fashion, the seal 4902 along the edge may be joined.

In one embodiment, referring to FIGS. 52-55 we see a proposed lid for the tank where top panels 5204 are used. These panels act like lily pads, floating on the liquid surface inside. In one embodiment, said panels 5204 are anchored 5206 to the floor of the tank via ropes, chains or any other suitable anchoring method, thus allowing it to move up/down while floating on top of the liquid, raising or lowering with the level of the liquid in the tank. The spacing 5202 between the pads may be made variable from zero tolerance to tight fit to gaps. Such spacing would allow the 'lily pad' design allows a human operator to fall in the tank, yet be able to swim to safety.

In one embodiment, we have a 100'×100' area to fill with lily pads covers that are 10'×10', so that you will cover the tank's area with 100 of them, anchored to cover the top with floating panels. These panels will be anchored to the tank strategically to allow the panel to adjust with the level and break away from the other 10'×10 panels to allow if anyone fell in to swim to safety or climb on one of the 10'×10' panels. In addition, the lid will act as insulation for the tank.

The panels themselves 5204 may be actively or passively solar equipped in order to heat the tank, or have all or portions of it be transparent so that operators may judge the condition of the fluid inside. Different edges 5502, 5504 may be used so that panels best realign and deflect with any winds.

Referring to FIG. 56-70, we see alternate embodiments of a modular fluid (including gases/liquids and their combination) tank specifically tailored for various temperature ranges, from low temperature cryogenic fluids to above freezing liquids. In one embodiment 5600, the tank is comprised of one or more segments or modules (5602, 5604 and/or 5606). These modules 5602, 5604, 5606 may be individually equipped with optional cooling, heating, filters and/or other inner volume environmental control devices (5608, 6102), as well as internal/external pipes 5614 for the addition/removal of heat. Thus, when the heat/cool is not installed, the tank is a simple fluid storage. Similar optional draining/filling openings 6210 may be located on any of the exposed walls (as shown on the side walls, the top/bottom and even the end cap 5616), allowing for the pressure or gravity filling/draining of the tank interior volume.

Similarly, one or more optional pressure and/or vacuum relief valves 5612 may be added (FIGS. 80-83) to the other safety devices (including said valves), safety regulators (e.g. as a Varec 180), hatches (including the addition of devices such as a Varec 221 pressure relief manway covers) and other devices (e.g. 5608, 6102) may be preferably located on the sides (ease of access), but may be in any convenient location. In one embodiment, each said device 5608, 6102 (i.e. on one side only) may be sized to service the volume of a segment, with the other unit being a spare, but larger/smaller units may be selected. Said valves 5612 may include devices similar in function to items like the Varec 2010B and 2020B pressure and vacuum relief valves, and similar such devices. As with tractor-trailer units, these devices 5608, 6102 may carry their own fuel (so as to function autonomously) and/or have all units in one combined tank 5600 be powered from a central source. The module may also have a vent, pressure, vacuum, safety or pop-off valve 5612 as well as one or more vents, viewing windows, fill level indicators and/or access panels/hatches 5610 to allow for access to the interior by personnel.

The sealed inner volume of the tank may be formed by sealing an end segment or module 5602 with a sealing wall or end cap 5616, by connecting two ends 5602 to each other, connecting an end 5602 to an inner portion 5606 having an end cap 5616 at the other end, or by creating a sealed tank from an inner portion 5604 that has two end caps 5616 at either end. Note the ends may be comprised of a 'bucket' configuration 5602, that is a one having only one opening, or by an inner section 5606 having an end cap 5616 at one end.

End caps 5616 may also be used to separate a long tank into two or more portions. The addition of remotely controlled valves and/or pumps to said end caps 5616 would then allow for the modular expansion of the tank. This would be accomplished by sealing a portion of the tank, adding one or more segments (5602, 5604, 5606), reestablishing the volumetric integrity of the sealed cavity and recirculating the fluid through the opening of said valves and/or activation of said pumps forcing the fluid across the end cap.

Of course, the assembly 5600 may have another assembly placed above it, allowing for the vertical growth of the storing units, which may or may not be interconnected. In all configurations, the one or more connected segments 5602, 5604, 5606 and end caps 5616 create one or more inner volumes, connected to each other and/or in concatenation with one or more inner portions 5606 may be added, in order to form a concatenated single sealed inner cavity.

While the unit may be built of any dimensions, an optimal dimension is one that allows for the portions to be 'trucked' to a location and assembled in-situ. In such a fashion, the basic module 5602, 5604, 5606 is wide enough to allow for transport above a semi-trailer.

As before (FIG. 33-36), the tank segments or portions (including the ends/inner portions (5602, 5604, 5606)) may be comprised of one or more of the materials listed, e.g. all or parts of metal (both ferrous and non-ferrous), wood (including composites such as particle board and compressed wood chips), carbon composites, Aerogel, Silica Aerogel, Aerographite, Glass, Synthetic fibers (e.g. fiberglass), Nanowire, Nanowires, nanotubes, Nanocellulose (including Nanocellulose Algae), Nanocellulose Aerogels, Grapheme, Grapheme Paper, Grapheme phoneme, Metallic Glass, Shrilk, Geofill Cellular Concrete, foam, polystyrene, fabricated expanded polystyrene, High Density polystyrene, Structural High Density EPS (polystyrene) and/or expanded polystyrene, concrete, fiberglass, carbon composites, etc.

In the simplest form, the segments are made of a single layer of material, with the material and its thickness determining the R-value (a measure used in the construction industry). Under uniform conditions, R-value is the ratio of the temperature difference across an insulator and the heat flux (heat transfer per unit area per unit time,) through it. In other embodiments, the unit may be comprised of an inner volume surrounded by insulation (such as foam and/or other suitable high R-value material, typically one with minimal structural strength) and an outer structural material.

For many liquids or gases (including but not limited to water), the above is enough to safely store the material. For other applications, including cryogenic storage of fluids (e.g. Liquefied Natural Gas (LNG)) and others optional cooling/heating modules 5608, 6102 connected to pipes 5614 containing fluids (e.g. refrigerants, fluids, etc.) so as to increase/decrease the heat within the internal tank volume in combination with the external units 5608, 6102.

Note the pipes 5614 may be HVC pipes 6202 if needed to ensure even cooling/heating/filtering or other types of units connected to the tank. In addition, while shown at the bottom, the pipes 5614 may also be along the side/top 6204 of the tank. re used, and the fluid is contained within the envelope formed by the connected tank segments.

The segments are linked to each other through interlocking means, such as bolts 6206 as fastener from one segment 5602, 5604, 5606 to another, although other fastening/interlocking means such as a pintle, pulley, turnbuckle or other tension fitting may be used to provide forces to hold the edges of each tank together. Similarly, module impermeable edge sealing means 6208 may be comprised of mechanical pressure fittings such as seal, gasket or other similar (gasket, O-ring, silicon weld, rhino-liner or other suitable seals).

The addition of the vents/hatches 5610 would allow for human or robot to enter the internal volume to apply, adjust and tighten the interlocking means (e.g. bolts/nuts 6206) and ensure the securing of the impermeable sealing means 6208 along the edge where the modules and/or end cap 5616 meet. Similarly, one or more wall openings may be featured in one or more modules 5602, 5604, 5606 to permit the flow of fluids from said inner sealed volume.

When built out of concrete or other similar compression-strong materials, the modules may be linked together via cables (steel, Kevlar, other similar materials) that run across conduits in every module from end to end and are post tensed. These one or more cables may be located along the entire periphery of the structure and others).

The above is a well-understood compression situation for concrete structures that provides the assembled vessel structural integrity. Dynamic pressure seals are used within the modules 5602, 5604, 5606 to provide an air and water tight seal. In other embodiments, the modules may be built of other materials, such as carbon-fiber reinforced walls, and connected to each other via fasteners.

The end cap 5614 may be sized to cover a complete opening in a module 5606, or enough so that the internal volume is separated but the bolt 6206 go through it onto the next module 5602, 5604, 5606. Similarly, the bolts 6206 and seal 6208 may go partially through 6602 or completely through 6802.

Referring to FIGS. 73-79 we see an embodiment of the system where a new binder system is used to secure the two or more wall or side panels 102 that make the walls of the unit to each other as well as to the one or more base panels 106. As seen in the detail exploded top view 7302 and side view 7402, this is best accomplished through the one or more eyehole bolt 7502 that are attached to each side panel 102 or base panel 106. These eyeholes 7502 go through the panel, their openings across the panels being sealed against leaks across said panel, and then have one or more metal rod 7504 that span the complete side of the tank.

In one embodiment, the eyeholes 7502 connected to the panel 102 have a rod 7504 connecting them, the eyeholes 7904 connected to the base 106 have a separate rod 7904 spanning them, and both are bound to each other through the tension applied by the binders 7506 spaced along their length at regular intervals, allowing the tension of the connection between eyeholes 7502, 7902 to keep the base of the tank sturdy and torsion/leak resistant.

Both neighboring side panels 102 and bottom panels 106 are secured to each other through a binder anchor pairing 7304 which is comprised of a binder attachment point 7702 on each panel, and a binder 7506 connecting these neighboring attachment points 7702. This allows the tension to keep the panels 102, 106 together. Similarly, to prevent horizontal displacement of the panel 102 near the base, one or more binders 7506 may connect an attachment point 7503 at the panel 102 base with an attachment point 7504 at the base 106.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A modular fluid storage system comprising:

one or more modules defining all or part of a sealed enclosed volume, each said module having one or more open sides, each said module open side having one or more module interlocking mechanisms and impermeable sealing mechanisms to allow said module to be securely attached to another said module and/or an end cap;

one or more module or end cap wall openings;

one or more access panel hatches installed in at least one said module or end cap, said access panel hatch allowing access to the interior of said sealed enclosed volume; and one or more of said modules are equipped with cooling, heating, pressure relief valves, vacuum relief valves and/or filter devices for inner volume environmental control.

2. The modular fluid storage system of claim 1 wherein:

one or more of said modules are made with one or more high R-value materials in a composite combination.

3. The modular fluid storage system of claim 2 wherein:

said module interlocking mechanisms are comprised of one or more bolts; and said module impermeable sealing mechanisms are comprised of one or more impermeable seal interface mechanical pressure fittings located along the module's opening edge.

4. The modular fluid storage system of claim 3, wherein:

one or more said impermeable sealing interface mechanical pressure fittings include at least one element selected from the group consisting of a gasket, O-ring, silicon weld, rhino-liner and/or other suitable seal.

5. A liquid storage tank apparatus comprising:

a tank base comprised of two or more floor panels, each said panels having one or more floor panel interlocking and waterproof sealing mechanisms, and a rim protruding upwards along portions of said floor panels forming the external perimeter of said liquid storage tank;

tank walls comprised of two or more tank wall panels, each said tank wall panel having one or more matching sets of wall interlocking and waterproof sealing mechanisms along the wall panel side and bottom joints, wherein at least one said wall panel has one or more wall openings;

base-wall interface waterproof sealing mechanisms at or near the periphery of said tank base; and one or more of said floor panel or wall panel interlocking mechanisms are comprised of one or more binders and binder attachment point arrangements.

6. The tank apparatus of claim 5, wherein:

one or more said floor panel or wall waterproof seal interface mechanical pressure fittings include at least one element selected from the group consisting of a gasket, O-ring, silicon weld, rhino-liner and/or other suitable seal; and said base-wall interface waterproof seal interface mechanical pressure fittings include at least one element selected from the group consisting of a continuous base channel or one or more gaskets around its inner perimeter where said tank base interfaces with said wall's base.

7. The apparatus of claim 5, wherein:

one or more of said floor panel or wall panel interlocking mechanisms are comprised of one or more eyeholes connected by rods and secured to each other by binders.

8. The tank apparatus of claim 7, wherein:

one or more said floor or wall waterproof seal interface mechanical pressure fittings include at least one element selected from the group consisting of a gasket, O-ring, silicon weld, rhino-liner or other suitable seal; and said base-wall interface waterproof seal interface mechanical pressure fittings include at least one element selected from the group consisting of a continuous base channel or one or more gaskets around its inner perimeter where said tank base interfaces with said wall's base.

* * * * *